(12) United States Patent  
Adkiins

(10) Patent No.: US 8,243,050 B2
(45) Date of Patent: Aug. 14, 2012

(54) STYLUS FOR A TOUCH-SCREEN DEVICE

(76) Inventor: Gordon K. Adkiins, St. George Island, FL (US)

( * ) Notice: Subject to any disclaimer, the term of this patent is extended or adjusted under 35 U.S.C. 154(b) by 998 days.

(21) Appl. No.: 12/154,986

(22) Filed: May 29, 2008

(65) Prior Publication Data

US 2008/0297493 A1    Dec. 4, 2008

Related U.S. Application Data

(63) Continuation-in-part of application No. 11/807,417, filed on May 29, 2007, now abandoned, and a continuation-in-part of application No. 11/977,966, filed on Oct. 26, 2007, now abandoned.

(51) Int. Cl.
*G06F 3/033* (2006.01)

(52) U.S. Cl. ........................................ 345/179; 345/173

(58) Field of Classification Search ........... 345/173–179
See application file for complete search history.

(56) References Cited

U.S. PATENT DOCUMENTS

| | | | | |
|---|---|---|---|---|
| 4,954,817 A | * | 9/1990 | Levine | 345/179 |
| 5,200,913 A | * | 4/1993 | Hawkins et al. | 361/679.09 |
| 5,453,759 A | * | 9/1995 | Seebach | 345/158 |
| 5,488,204 A | * | 1/1996 | Mead et al. | 178/18.06 |
| 5,581,484 A | * | 12/1996 | Prince | 702/150 |
| 5,706,026 A | * | 1/1998 | Kent et al. | 345/156 |
| 5,877,459 A | * | 3/1999 | Prater | 178/19.06 |
| 5,912,662 A | * | 6/1999 | Bunn et al. | 345/179 |
| 5,999,170 A | * | 12/1999 | Ooura et al. | 345/179 |
| 6,249,277 B1 | * | 6/2001 | Varveris | 345/179 |
| 6,587,090 B1 | * | 7/2003 | Jarra | 345/156 |
| 6,626,598 B2 | * | 9/2003 | Schneider | 401/8 |
| 2005/0093835 A1 | * | 5/2005 | Mortarelli | 345/179 |
| 2006/0237386 A1 | * | 10/2006 | Ouzonian | 212/201 |
| 2007/0013681 A1 | * | 1/2007 | Chou | 345/179 |
| 2008/0106520 A1 | * | 5/2008 | Free et al. | 345/173 |
| 2009/0278818 A1 | * | 11/2009 | DiNozzi et al. | 345/179 |
| 2011/0007035 A1 | * | 1/2011 | Shai | 345/179 |

OTHER PUBLICATIONS

U.S. Appl. No. 11/807,417.
U.S. Appl. No. 11/977,966.

* cited by examiner

*Primary Examiner* — Alexander Eisen
*Assistant Examiner* — Nelson Lam
(74) *Attorney, Agent, or Firm* — J. Wiley Horton

(57) ABSTRACT

A stylus for use in operating any small device requiring contact for inputting commands. The stylus is comprised of a wrap and a tip. The wrap encircles and engages a user's digit. The tip is positioned to easily contact a touch-screen device when the wrap is placed on a user's digit. The stylus is made of a conductive material such that a conductive connection is made between the user's digit and the touch-screen device.

20 Claims, 44 Drawing Sheets

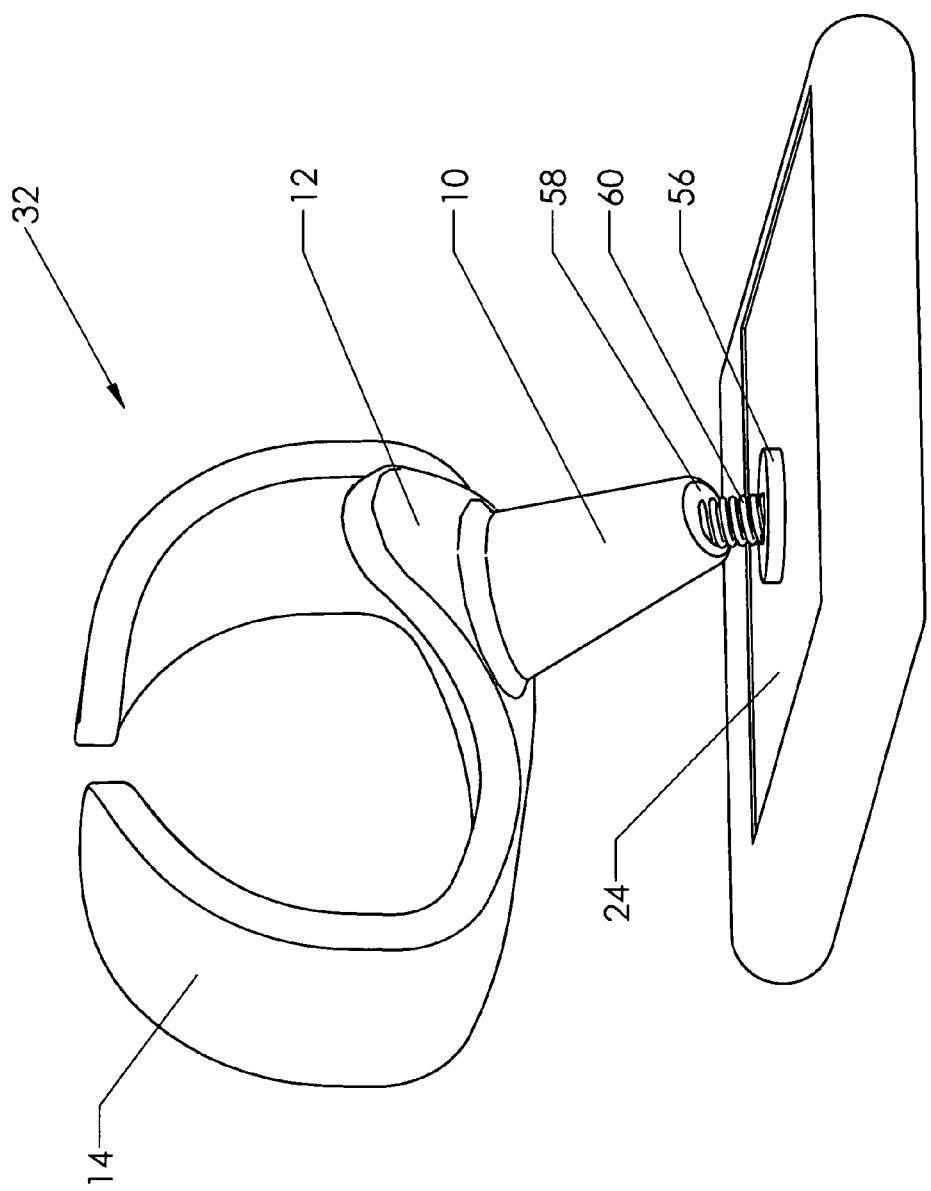

STYLUS FOR A TOUCH-SCREEN DEVICE

CROSS-REFERENCES TO RELATED APPLICATIONS

This non-provisional application is a continuation-in-part of U.S. patent application Ser. No. 11/807,417 (filed on May 29, 2007) now abandoned and U.S. Continuation-in-Part patent application Ser. No. 11/977,966 (filed on Oct. 26, 2007) now abandoned. The applications list the same inventor.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of devices made for operation of touch responsive user interfaces. More specifically, the invention comprises a stylus modified for attachment to a user's thumb or finger so as to operate a device using a touch-screen or small buttons.

2. Description of the Related Art

Personal Digital Assistants (PDA's) including electronic organizers, palmtops, and other hand-held devices are in wide use today. PDA's typically have a touch-screen and/or small buttons allowing data entry and selections. Generally a user would operate the touch-screen and small buttons with the provided stylus (in the shape of a small pen) or the user's finger.

A small pen-shaped stylus is utilized in much the same way as a pen. The stylus allows the user to make contact with the touch-screen commands or small buttons. However, the small size of the stylus and screen makes these operations awkward. Additionally, the user must hold the device in one hand and operate the stylus with the other hand, leaving no hand free. Using a fingertip in place of the stylus is also difficult, as the tip of a finger is broad compared to the small touch-screen command buttons. Using a stylus instead of a finger is preferable, since the transfer of natural oils from a user's finger onto the touch-screen shortens the life of the touch-screen.

The iPhone, created and sold by Apple, Inc., of Cupertino, Calif., is becoming a popular replacement for traditional PDA devices. Although some aspects of the iPhone's functionality are similar to traditional PDAs, there are some significant differences. One of these differences is the iPhone's multi-touch-screen technology. The iPhone touch-screen, unlike current PDA touch-screen technology, utilizes a layer of capacitive material to sense contact. If the user touches the capacitive material the amount of charge at the contact point changes. The capacitive touch screen monitors that change in the electrical current to determine the point of user contact on the screen. Like a traditional PDA, the individual touch-screen commands are cumbersome to contact by way of the user's finger, especially when trying to compose an e-mail on the virtual keyboard. However, unlike a traditional PDA, a prior art stylus will not interact with the capacitive touch-screen, due to the mechanical and electrical properties of the stylus.

A stylus allowing one-handed operation of a conventional touch-screen device and operational interaction with a capacitive touch-screen device would be desirable. Unfortunately, these dual requirements mean that the stylus, which spans the distance between the screen and the user's thumb or finger, will need to have different characteristics for the different applications. The present invention achieves this objective by using appropriate materials for the stylus, as well as appropriate geometry.

BRIEF SUMMARY OF THE INVENTION

The present invention comprises a stylus for use in the operation of any small device requiring the actuation of small buttons or the entry of touch-screen commands. The stylus is comprised of a wrap and an attached stylus tip. The wrap encircles a user's digit thereby attaching the stylus to the digit. The tip of the stylus extends from the central axis of the user's digit so that it may be conveniently used to make contact with the screen or buttons on a hand-held device.

In the preferred embodiment, the wrap and stylus tip are completely comprised of a pliable and conductive material. The tip can incorporate an attachment which specifically configures it for operation with a particular device. The attachment preferably has a pliable conductive surface configured to interact with a capacitive touch-screen device.

BRIEF DESCRIPTION OF THE SEVERAL VIEWS OF THE DRAWINGS

FIG. 29 is a perspective view, showing an alternative embodiment of the present invention against a touch-screen device.

REFERENCE NUMERALS IN THE DRAWINGS

| 10 | tip | 12 | tongue |
|---|---|---|---|
| 14 | wrap | 16 | lanyard hole |
| 18 | digit | 20 | hand-held device |
| 22 | lanyard | 24 | touch-screen |
| 26 | central axis | 28 | angle of descent |

-continued

| 30 | crossbar | 32 | stylus |
|---|---|---|---|
| 34 | magnet | 36 | hand |
| 38 | hook | 40 | concave cup |
| 42 | pen | 44 | nipple |
| 46 | tip body | 48 | conductive contactor |
| 50 | cap | 52 | resilient material |
| 54 | pliable conductive layer | 56 | contact disc |
| 58 | bridge surface | 60 | spring |
| 62 | ball | 64 | socket |
| 66 | stem | 68 | touch circle |
| 70 | conductive ribbon | 72 | conductive plating |

DETAILED DESCRIPTION OF THE INVENTION

FIGS. 1 through 15 illustrate the invention that is described and claimed in copending U.S. application Ser. No. 11/807, 417 (filed on May 29, 2007). FIGS. 16-24 illustrate features that are claimed in copending U.S. Continuation-In-Part application Ser. No. 11/977,966 (filed on Oct. 26, 2007). FIGS. 25-32 illustrate features that are new in this application. Many of the features claimed in the present application are common to those disclosed in Ser. Nos. 11/807,417 and 11/977,966. A full discussion of the features originally contained in Ser. Nos. 11/807,417 and 11/977,966 is included in this application so that the reader will not be forced to refer to external materials in reviewing this disclosure. The reader should also bear in mind that any of the new features disclosed in FIGS. 25-32 could be combined with the features disclosed in FIGS. 1-24.

Figure 1:
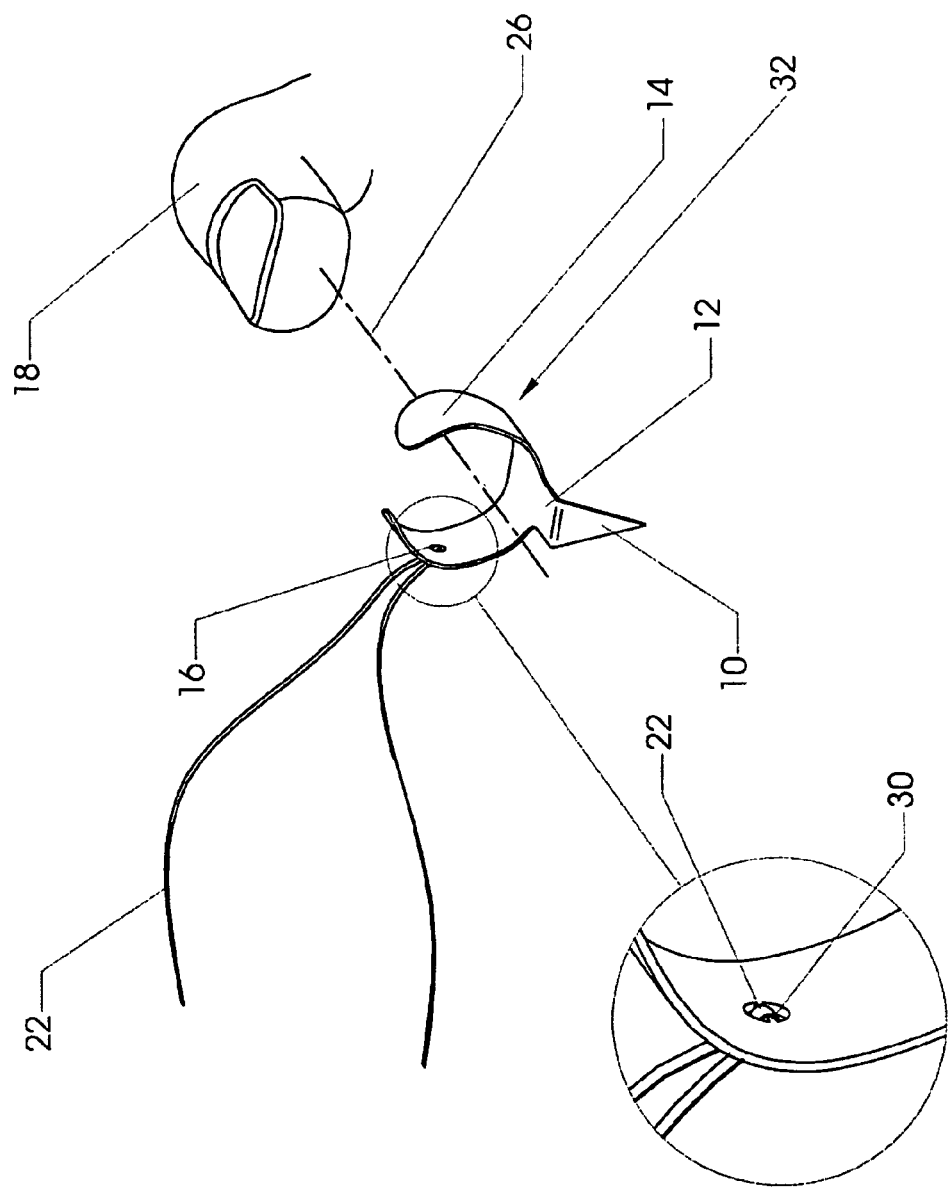
FIG. 1 is a perspective view, showing the present invention in relation to a user's thumb.
Figure 2:
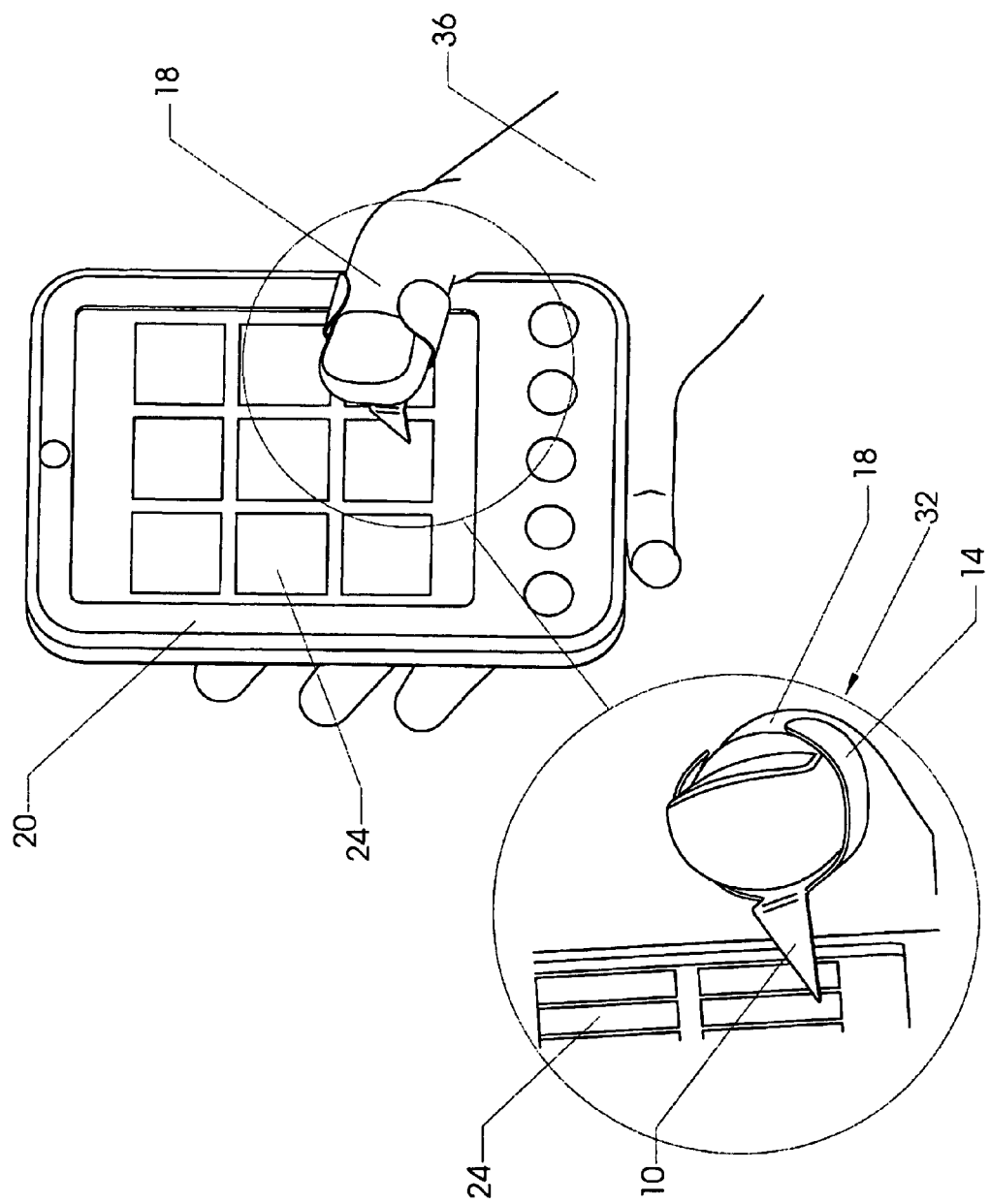
FIG. 2 is a perspective view, showing the present invention being used on a hand-held device with one hand.

FIG. 1 shows a stylus 32 in position to be installed on a user's digit 18 (preferably a thumb but possibly a finger or even a toe). This view shows digit 18 of the user aligned with stylus 32. Wrap 14 is configured to encircle a user's digit 18 along central axis 26. "Digit" for purposes of this invention is defined as any finger or thumb on either hand of the user or any toe on either foot of the user. Digit 18 of the user slides or fits into wrap 14. Wrap 14 can be made of any material. Wrap encircles digit 18 and allows the user to adjust the grip of wrap 14. For example, wrap 14 can be made up of plastic which frictionally engages digit 18 or of a deformable material which the user presses inward to clamp to digit 18, such as certain metals.

Wrap 14 preferably contains a lanyard hole 16 through which a lanyard 22 can be threaded. In one embodiment of the present invention lanyard hole 16 contains a crossbar 30 around which lanyard 22 is threaded. As the reader will observe in FIG. 4, lanyard 22 can be attached to hook 38 located on hand-held device 20 to prevent the user from losing or dropping the small stylus 32. Returning to FIG. 1, tongue 12 of stylus 32 extends outward from wrap 16 in a direction approximately parallel to central axis 26 of the digit 18. Tip 10 attaches to any point on tongue 12. Tip 10 extends downward from central axis 26 of digit 18.

Figure 3:
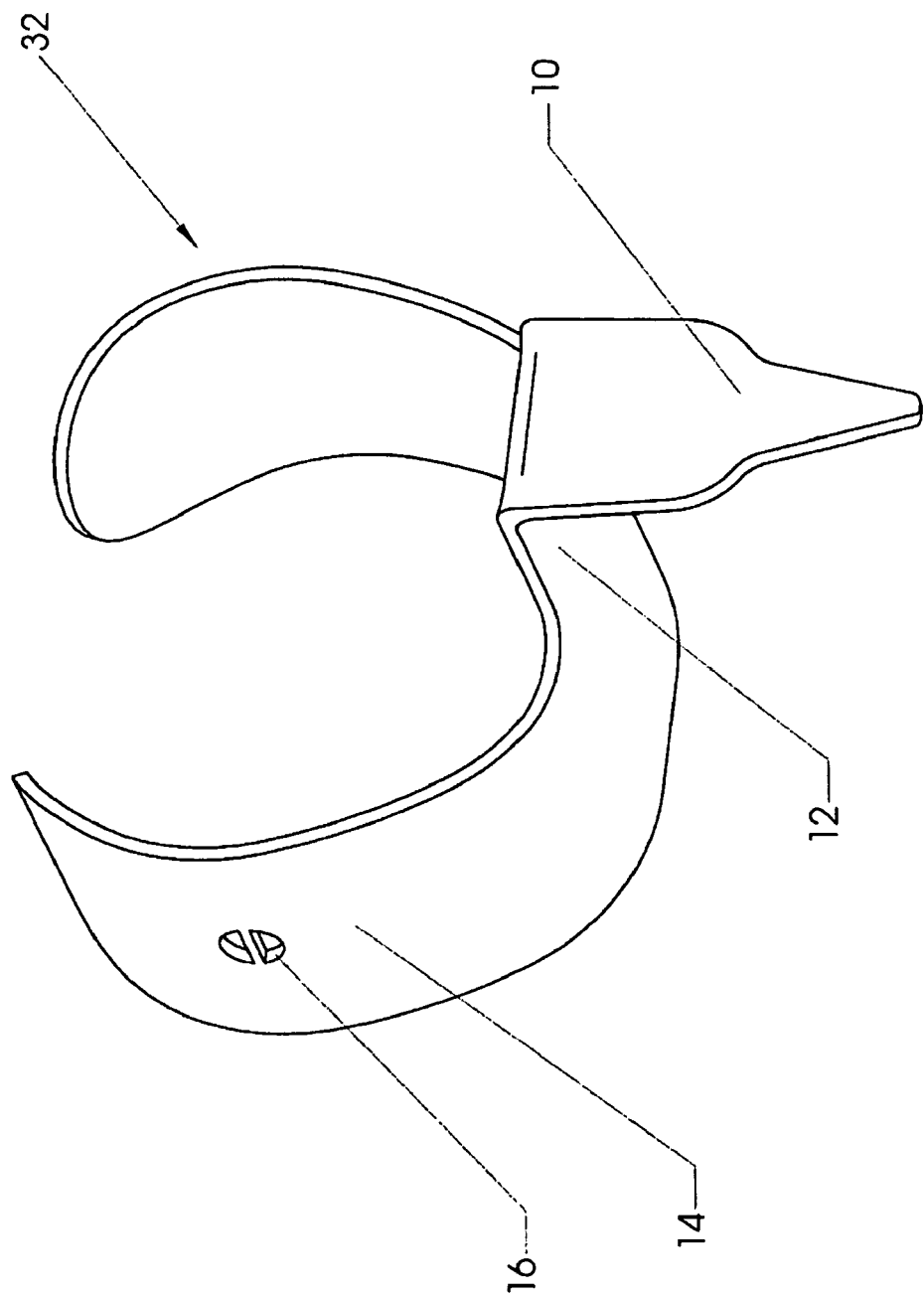
FIG. 3 is a perspective view, showing one embodiment of the present invention.

Continuing now to describe the general features common to both Ser. No. 11/807,417 and the present disclosure, FIG. 2 portrays how the hand-held device 20 is fully operative with only one hand 36 when utilizing stylus 32. Hand 36 cradles hand-held device 20 while digit 18, preferably the user's thumb, operates touch-screen 24. As shown in the detail view of FIG. 2, stylus 32 is secured to digit 18 by wrap 14. The user can freely move digit 18 and stylus 32 around touch-screen 24. Because tip 10 descends downward with respect to central axis of digit 18, the user can comfortably operate touch-screen 24 without awkwardly bending digit 18 to make contact with touch-screen 24. By eliminating the need to hold digit 18 in a constant bent position, the invention allows the user to operate hand-held device 20 comfortably for extended periods of time. FIG. 3 illustrates some structural details. This view of stylus 32 better illustrates the descent of tip 10 away from tongue 12 of stylus 32. The tip is thereby displaced a distance from the user's digit, which makes the stylus easier to use.

Figure 4:
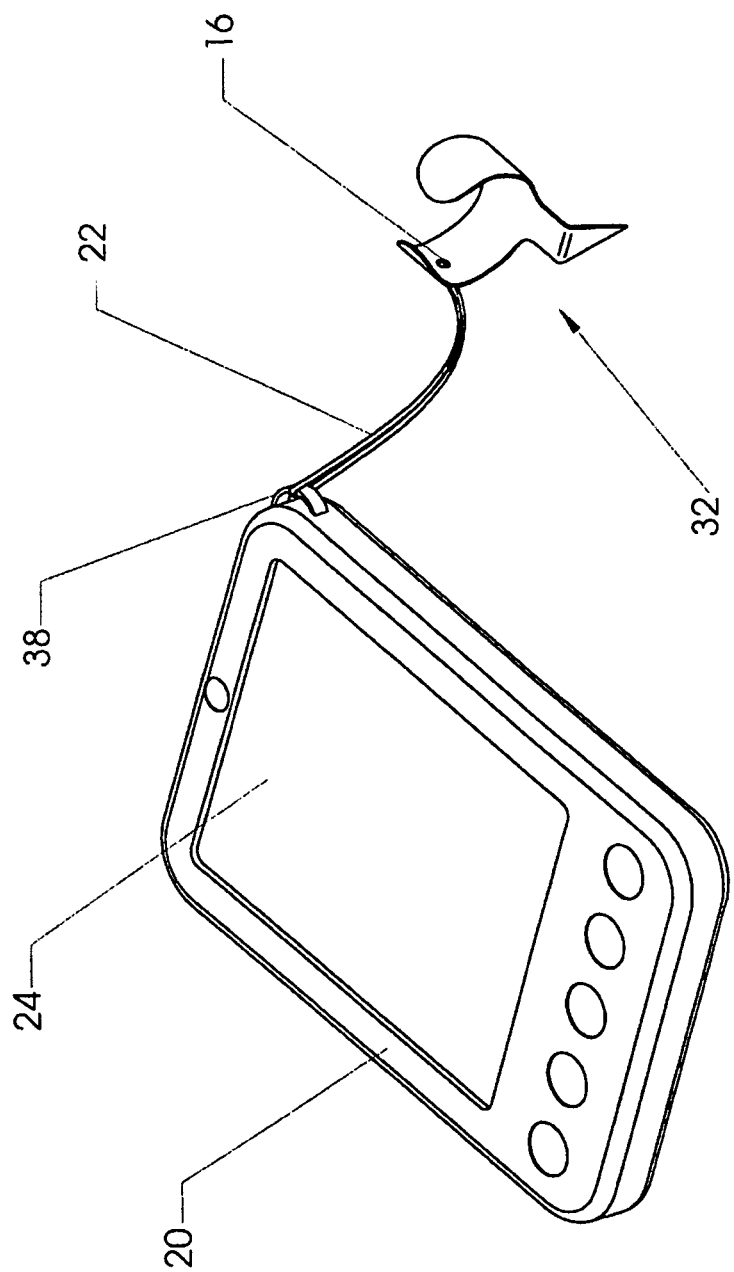
FIG. 4 is a perspective view, showing the present invention attached to a hand-held device by way of a lanyard.
Figure 5:
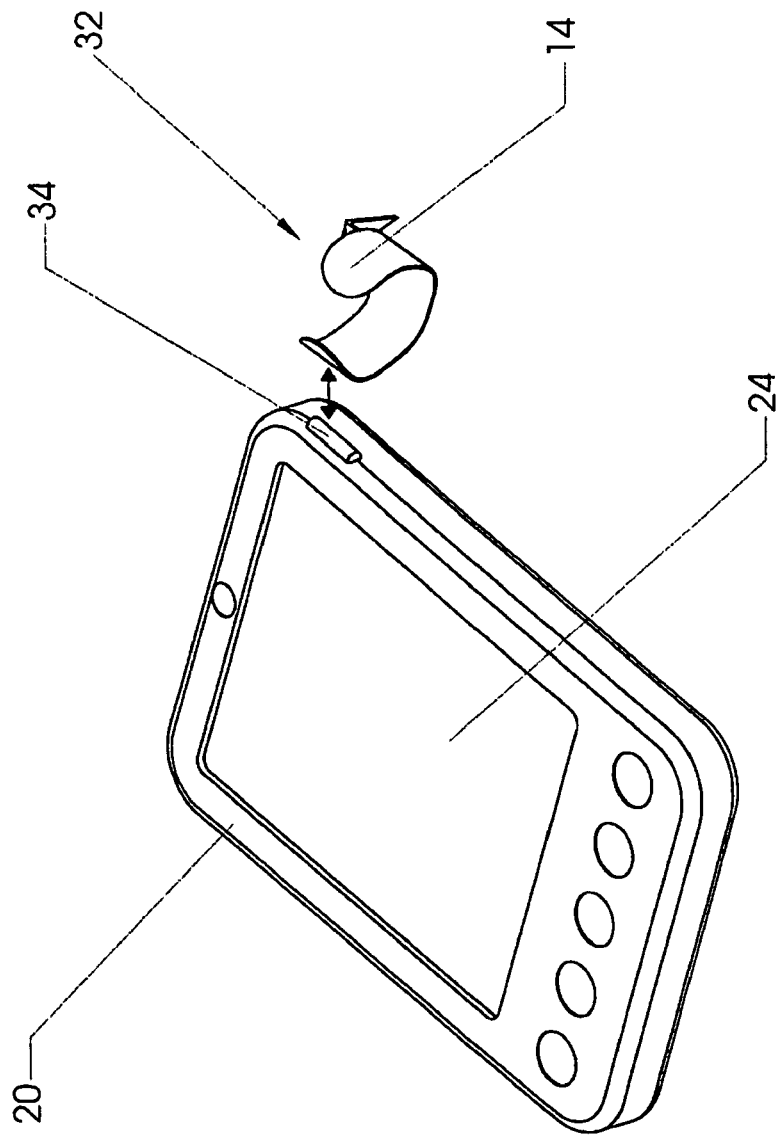
FIG. 5 is a perspective view, showing a means of attaching the present invention to a hand-held device by way of a small magnet.

As the reader will observe in FIG. 4 and FIG. 5, there can be several different ways of attaching stylus 32 to hand-held device 20. In FIG. 4 lanyard 22 attaches stylus 32 to hook 38 on hand-held device 20. FIG. 5, on the other hand, illustrates stylus 32 lining up with magnet 34. Magnet 34 is located on the side of hand-held device 20 and is preferably a neodymium magnet which attracts stylus 32. Stylus 32 is either made of a material which inherently engages magnet 34 or a strip of material which engages magnet is permanently attached to stylus 32.

Figure 6:
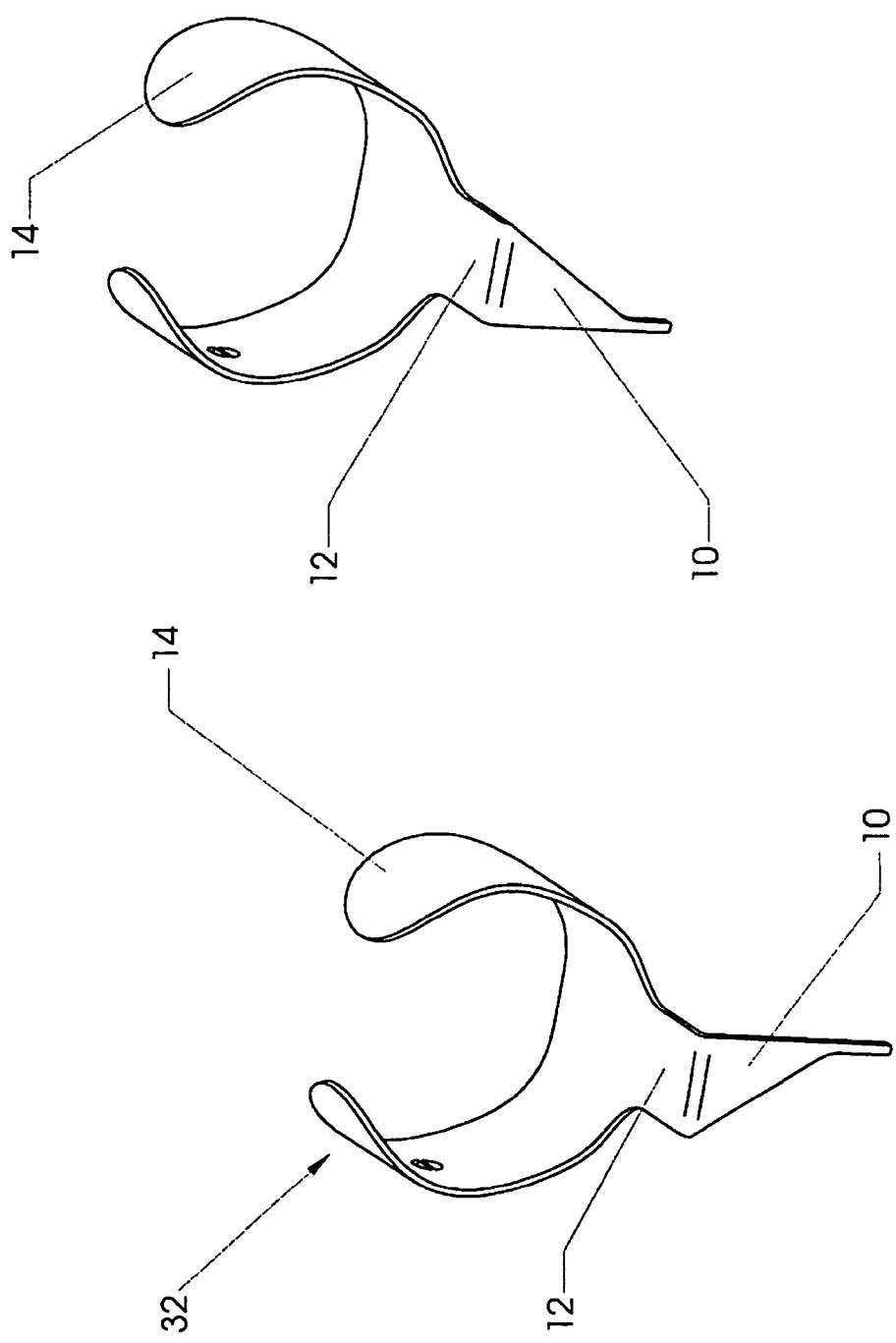
FIG. 6 is a perspective view, showing alternative embodiments for the position of the tip of the stylus.

FIG. 6 illustrates an alternative embodiment of the stylus where tip 10 of stylus 32 is offset to the right or the left of tongue 12. As the position of tip 10 changes, the pressure on touch-screen 24 may vary according to how each particular user aligns digit 18 with hand-held device 20. The different available positions of tip 10 allow each individual user to choose a stylus incorporating the most comfortable tip position according to each user's preference.

Figure 7:
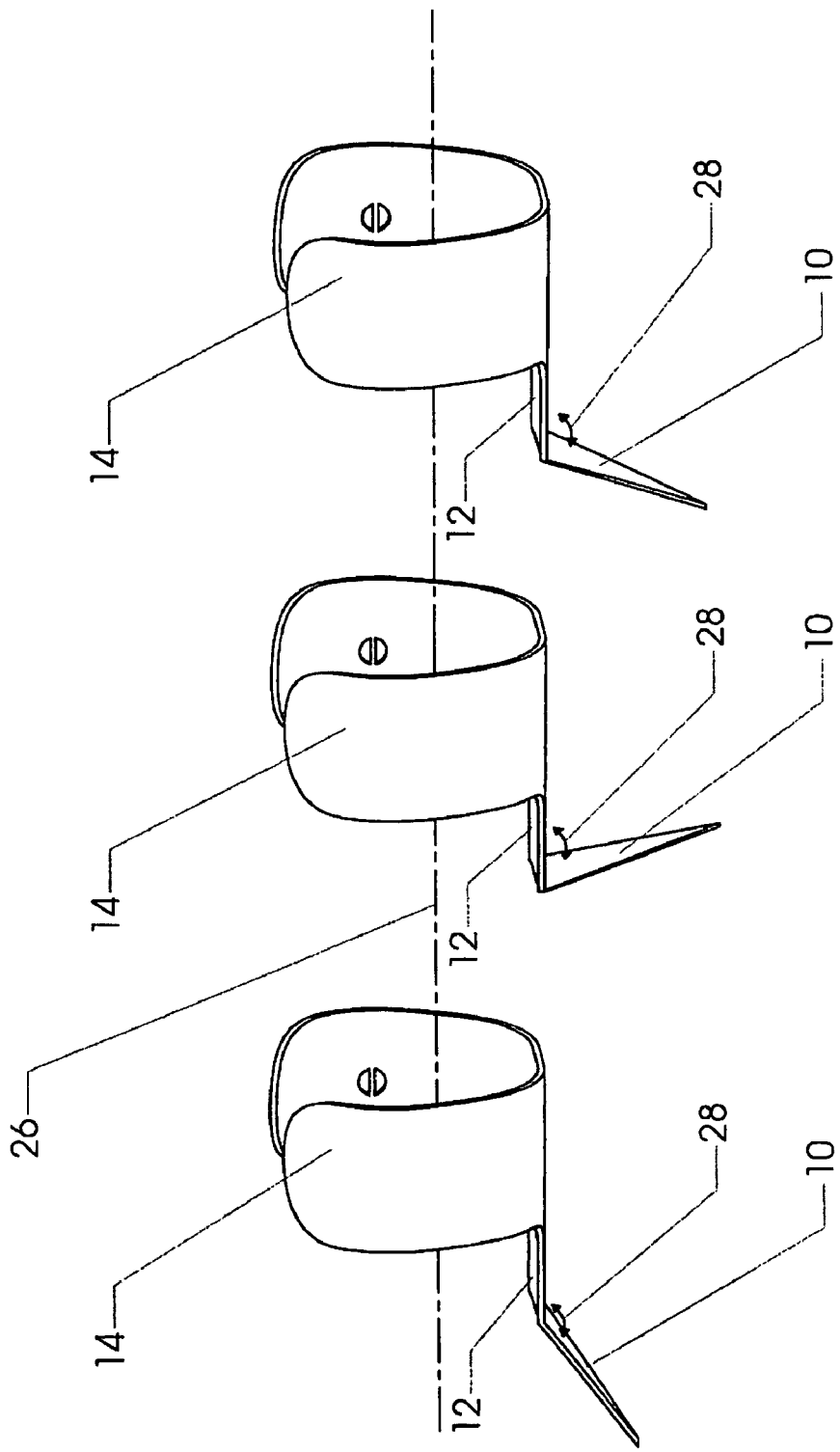
FIG. 7 is a side view, showing several possible embodiments of the invention with different angles of the tip of the stylus in relation to the tongue and central axis of the thumb.

FIG. 7 shows a side view of three different embodiments of the present invention. Each embodiment includes a different angle of descent 28. Angle of descent 28 is created by the intersection between the plane of tip 10 and the plane of tongue 12, which is also approximately parallel to the base of wrap 14 and central axis 26. As the reader will observe, angle of descent 28 can be acute, obtuse or 90 degrees. Similar to the choice of tip position, the user would be able to choose the most comfortable angle of descent 28 dependent on the user's personal preference.

As FIG. 6 and FIG. 7 show, the orientation of tip 10 to tongue 12 and base of wrap 14 can be significantly varied. However, in each variation tip 10 descends downward from the central axis of the user's digit. This ensures that the user, using only one hand, can easily interact with touch-screen 24.

Figure 8:
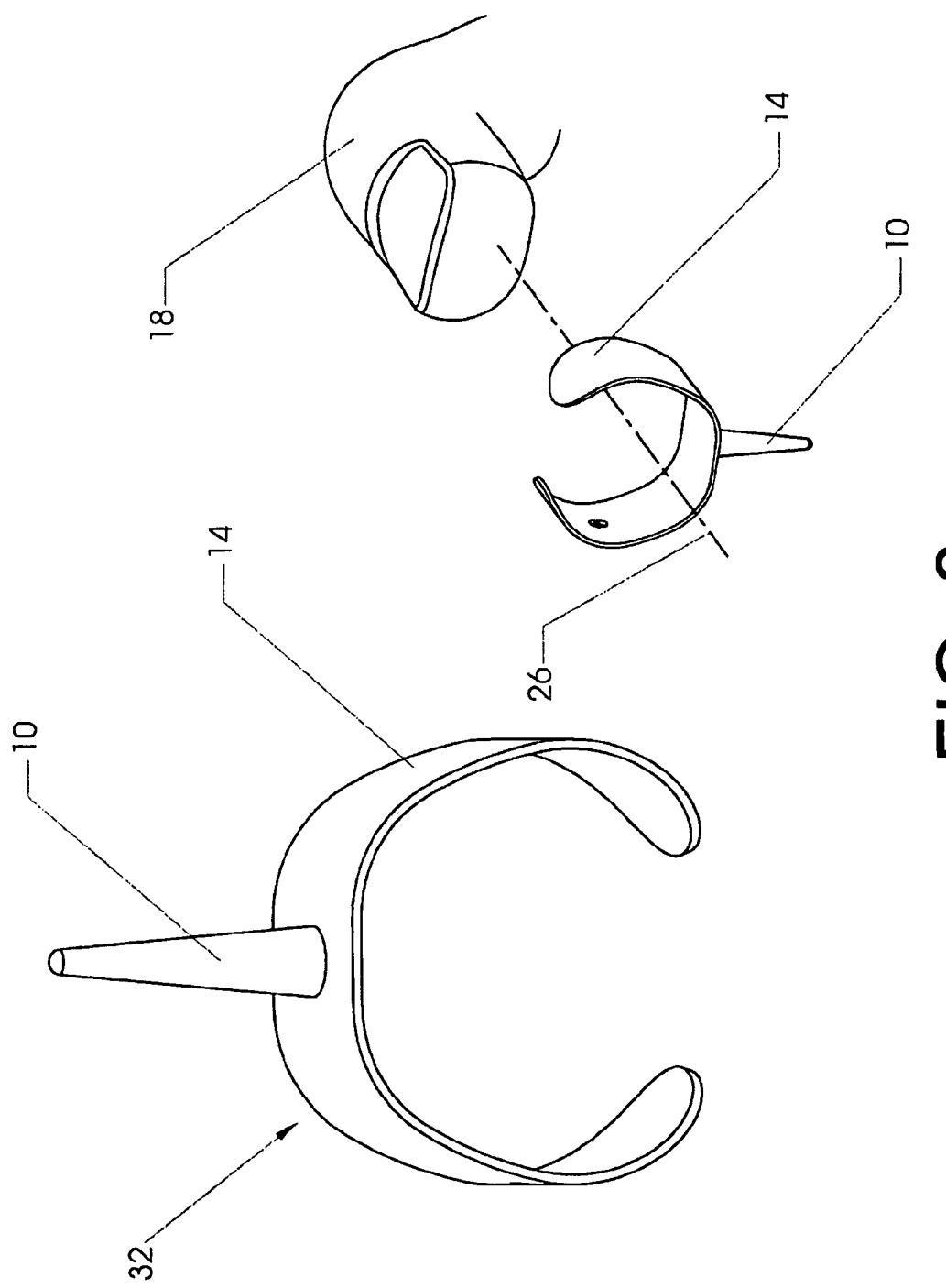
FIG. 8 is a perspective view, showing an alternative embodiment of the present invention.

FIG. 8 illustrates the use of a descending tip that is attached directly to wrap 14 instead of tongue 12. The narrow end of tip 10 ends in a convex cup which is used to communicate with hand-held device 20. The reader will observe that tip 10 still descends downward away from central axis 26 of the user's digit 18, though the tongue has been omitted. The use of the device is essentially the same.

Figure 9:
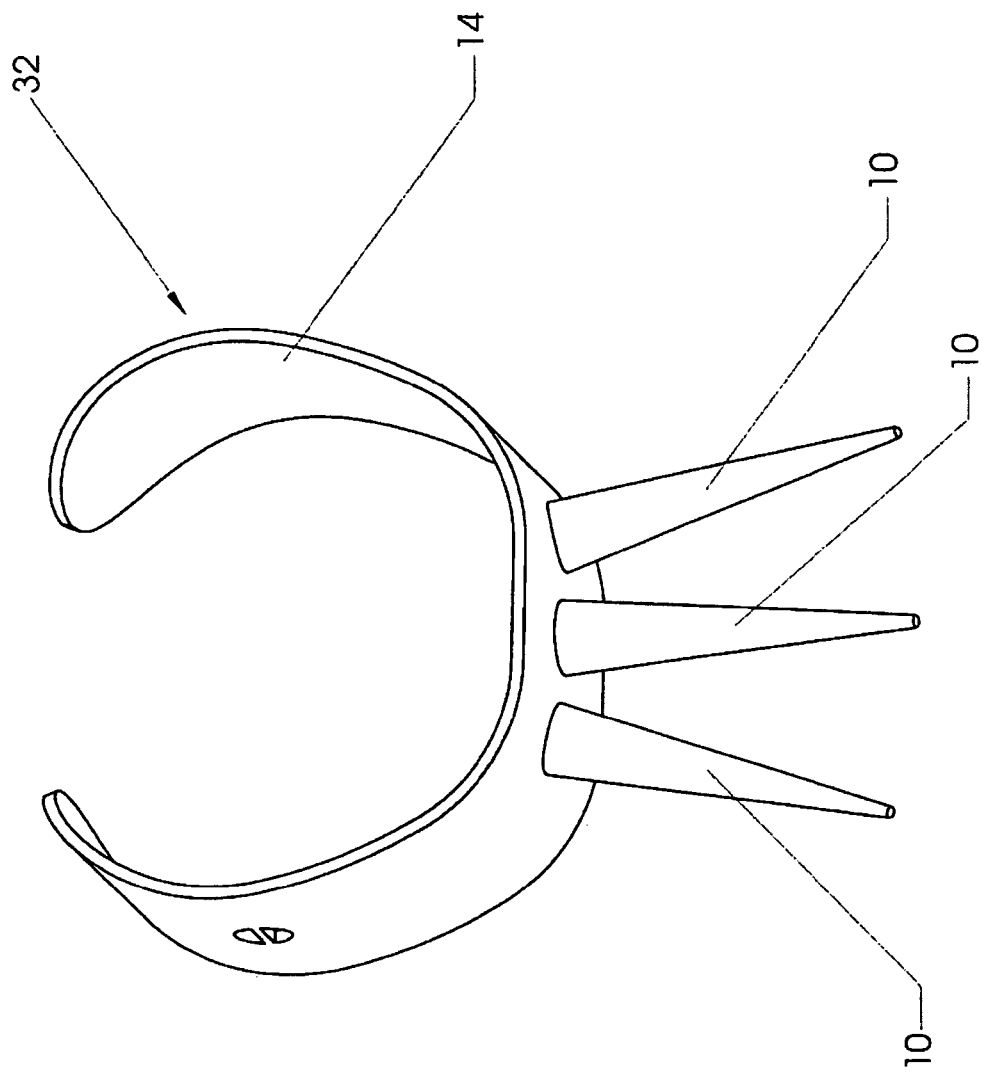
FIG. 9 is a perspective view, showing an alternative embodiment of the present invention with multiple tips.
Figure 10:
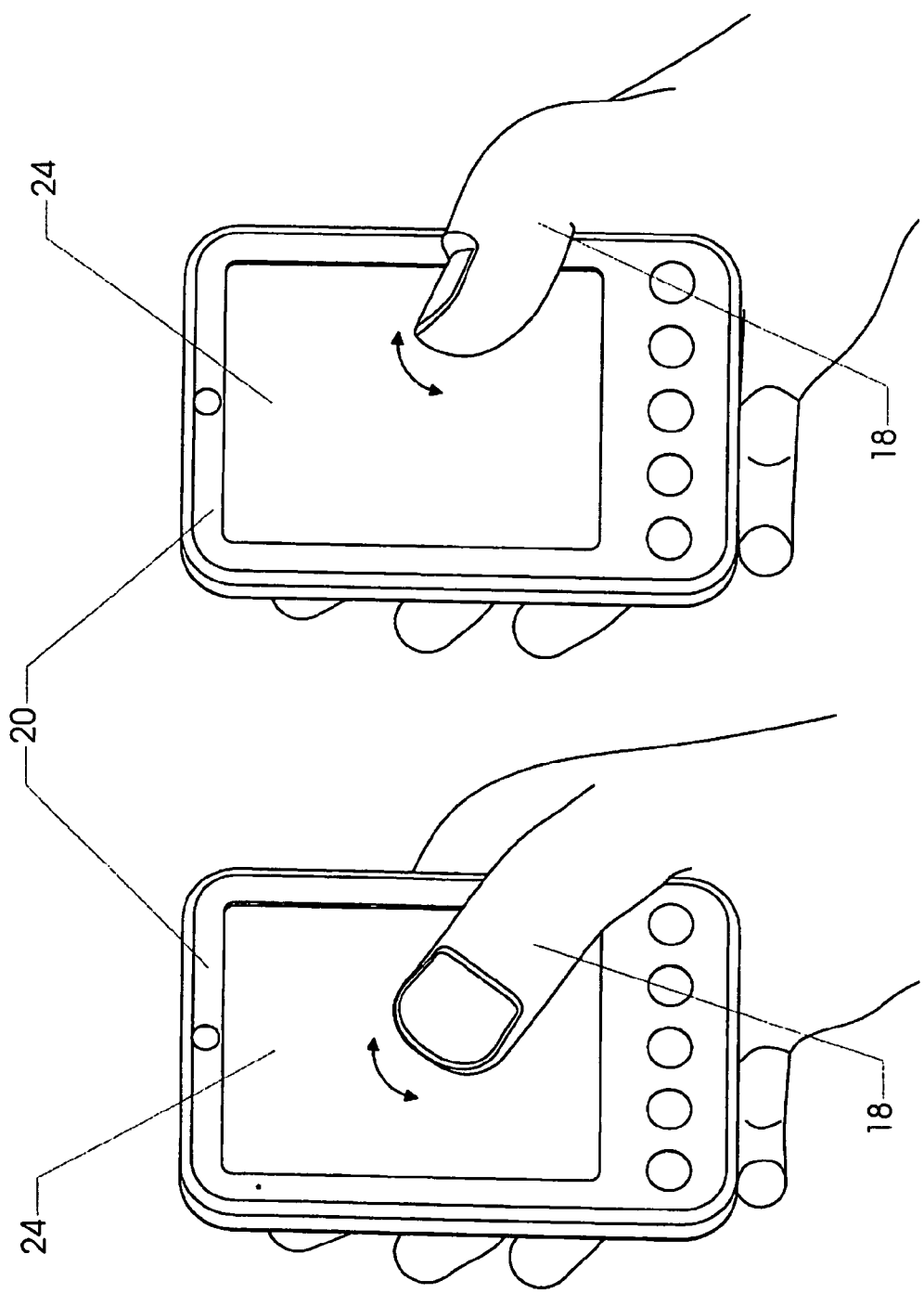
FIG. 10 is a perspective view, showing the user's thumb rotation as it moves across touch-screen of hand-held device.

FIG. 9 illustrates another embodiment which has more than one tip 10 descending downward away from central axis 26 of the user's digit 18. By having a second or third tip 10 protruding from wrap 14, the user will be able to operate hand-held device 20 with greater ease and comfort since the thumb rotates while moving across touch-screen 24. This natural rotation of the user's thumb as it moves across the touch-screen is illustrated in FIG. 10. As the user's digit 18 rotates the middle tip 10 may no longer provide the best point at which to contact touch-screen 24.

Figure 11:
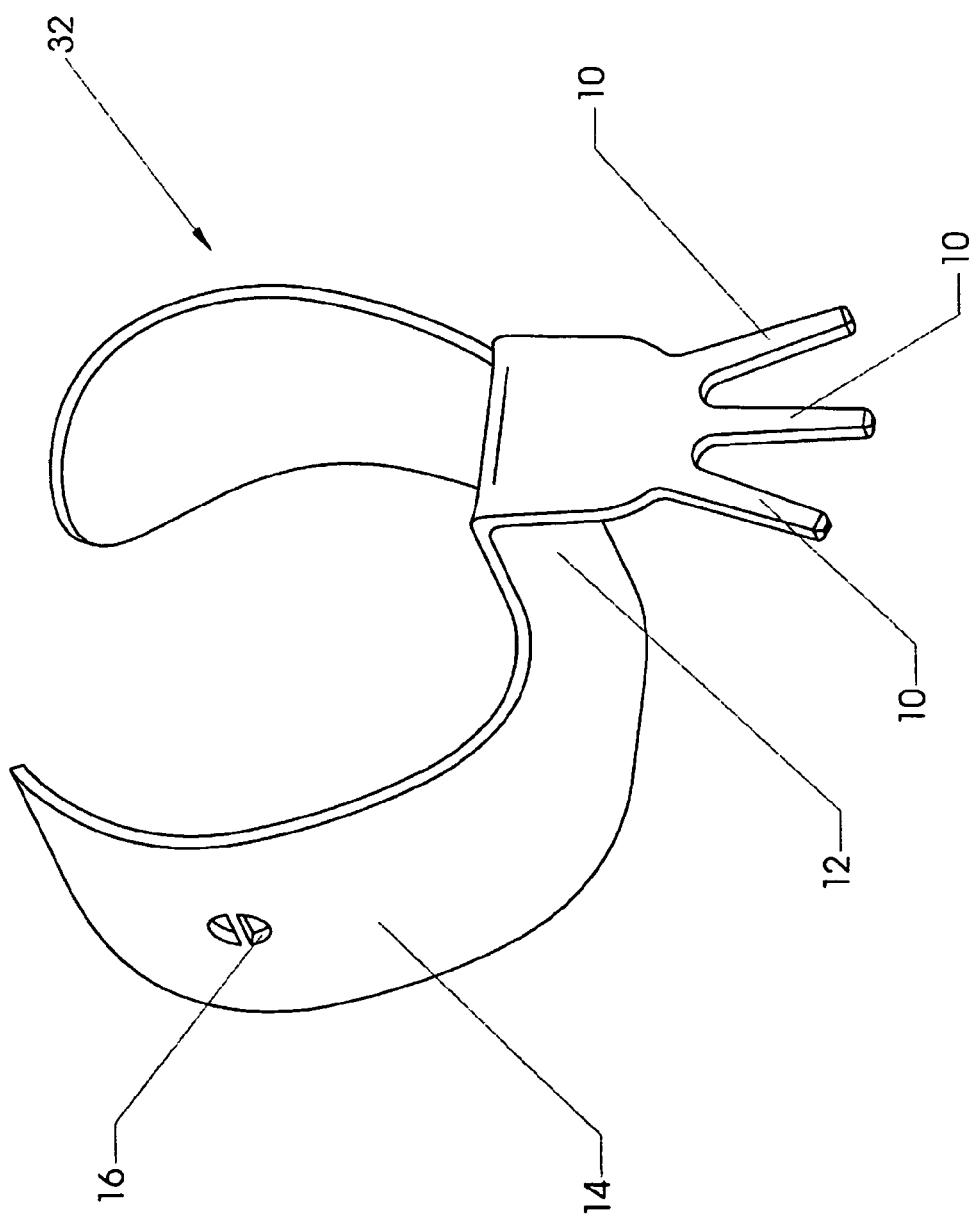
FIG. 11 is a perspective view, showing an alternative embodiment of the present invention with multiple tips.

FIG. 10 exemplifies the rotation of the user's thumb. As digit 18 moves across touch-screen 24 digit 18 rotates in relation to touch-screen 24. By having an additional tip offset to the right of user's thumb as seen in FIG. 9 and FIG. 11, the user can contact touch-screen 24 with the additional tip 10 without having to overcompensate to continue to use the middle tip 10. Alternatively, a left-handed individual would benefit from an additional tip offset to the left of user's left thumb. The additional tip 10 will reduce the amount of movement required to operate hand-held device 20. The reduction in overall movement, particularly the bending motion, will also reduce the fatigue which can occur during the operation of hand-held device 20. FIG. 11 shows a version in which multiple tips descend from a single tongue.

Figure 12:
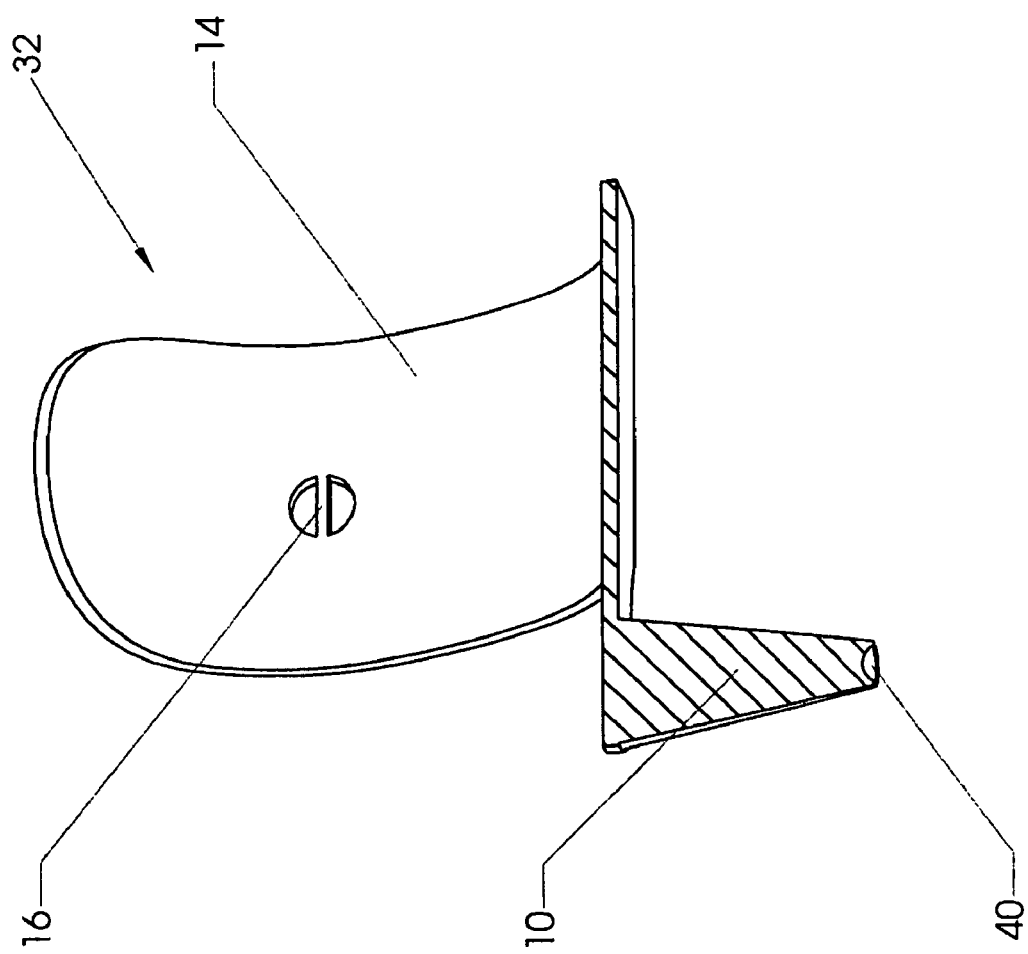
FIG. 12 is a perspective view, showing an alternative embodiment of the present invention with a concave cup at the narrow end of tip.

FIG. 12 illustrates an alternative configuration for the tip geometry. Some devices require the actuation of buttons (such as a miniature keyboard). These buttons are often dome-shaped. The use of a convex tip with the dome-shaped buttons can be difficult. Accordingly, in such applications, it is preferable to provide a concave tip. FIG. 12 is a sectional view illustrating such a tip. Concave cup 40 allows the user to more easily engage a domed structure located on hand-held device 20. In one embodiment the surface area of concave cup 40 would be made up of a rubber material to increase the gripping ability of stylus 32. Concave cup 40 could be applied to any stylus tip.

Figure 13:
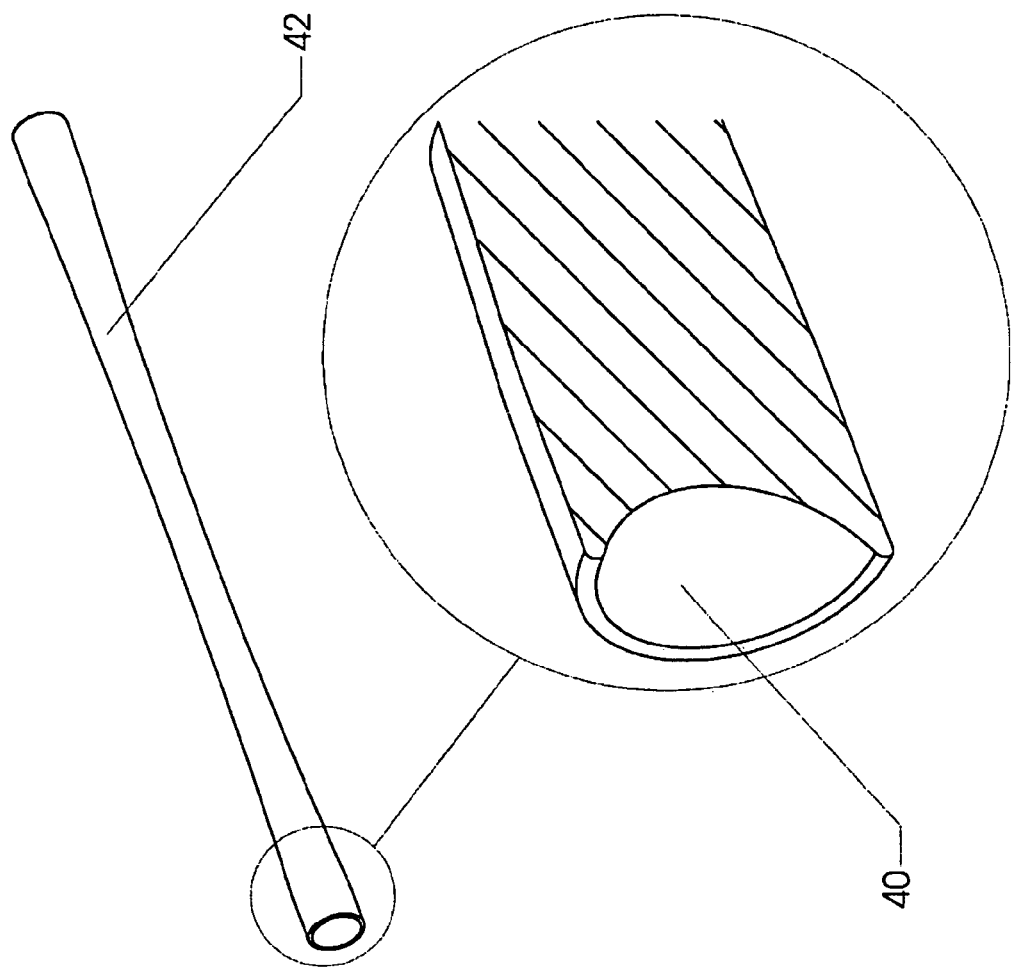
FIG. 13 is a perspective view, showing a concave cup at the end of a stylus pen.

FIG. 13 shows concave cup 40 located at the end of a stylus pen 42. Concave cup 40 allows the user to more easily rotate a domed structure as the user moves pen 42. However, although the device of FIG. 13 is disclosed for informational purposes, it is not claimed in this application.

Figure 14:
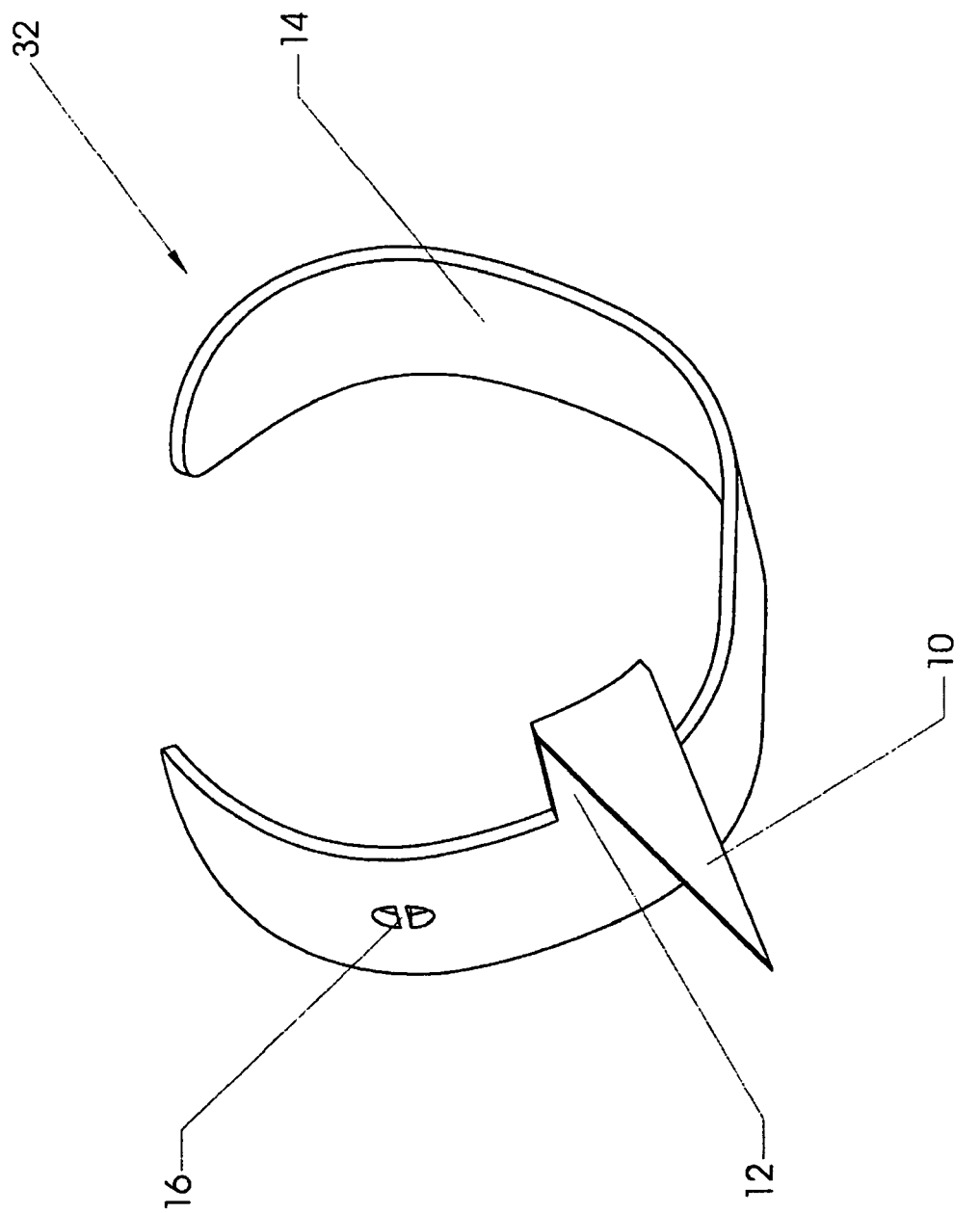
FIG. 14 is a perspective view, showing an alternative embodiment of the present invention with an angular tip.

FIG. 14 illustrates a stylus in which tip 10 extends outward in a direction approximately perpendicular to the wrap's central axis. In this embodiment tongue 12 and tip 10 are offset to the right or left of wrap 14. A user may be more comfortable utilizing tip 10 in this position due to the natural alignment of digit 18 with hand-held device 20. Tip 10 can also extend directly from wrap 14 eliminating the need for tongue 12.

Figure 15:
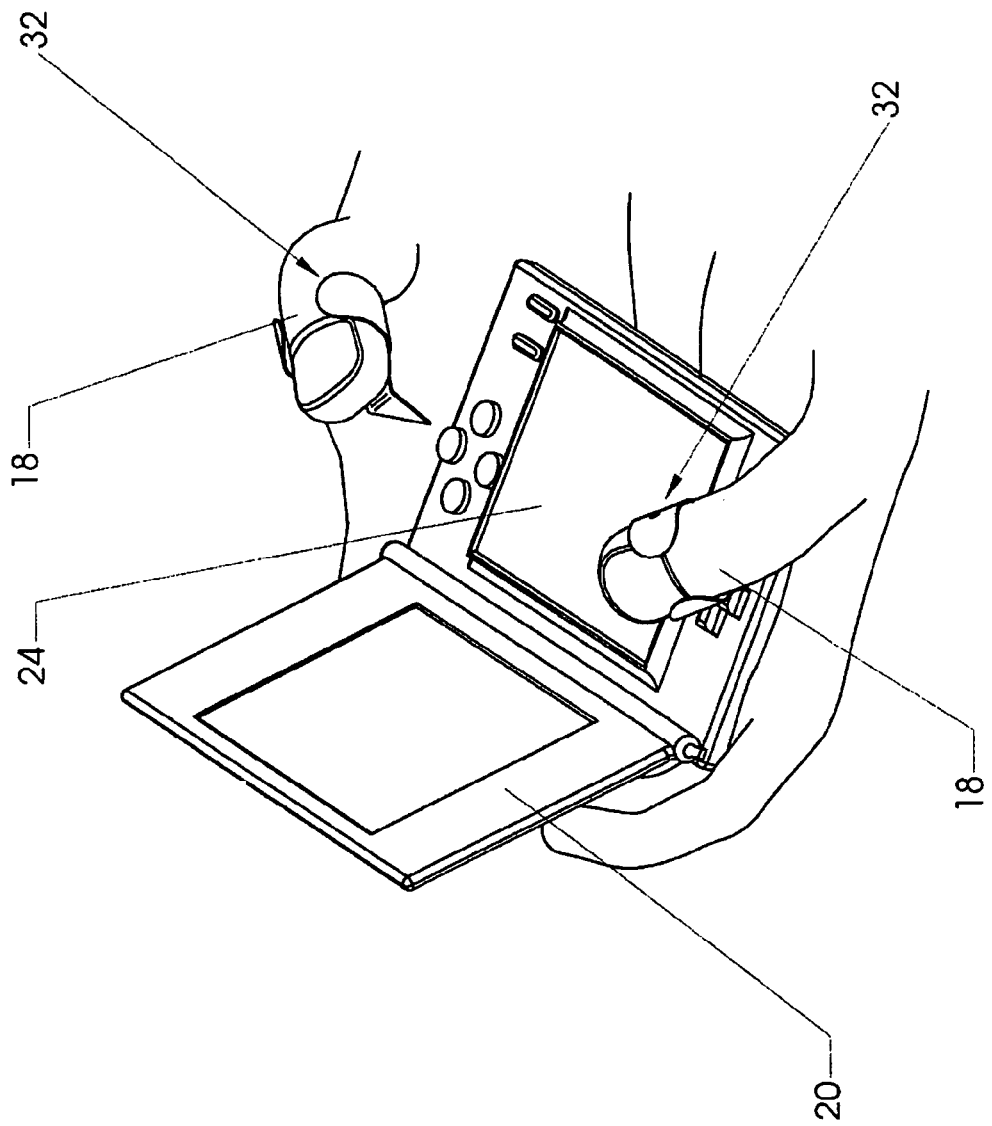
FIG. 15 is a perspective view, showing the user operating a touch-screen device with two digits and two styluses.

FIG. 15 illustrates a user operating hand-held device 20 while utilizing two digits 18. This is common for computer gaming devices such as those used in the NINTENDO™ games. The use of two of stylus 32's in this manner allows a user better access to touch-screen 24 with both the left and right digit 18. This can result in enhanced game play for the user.

Figure 16:
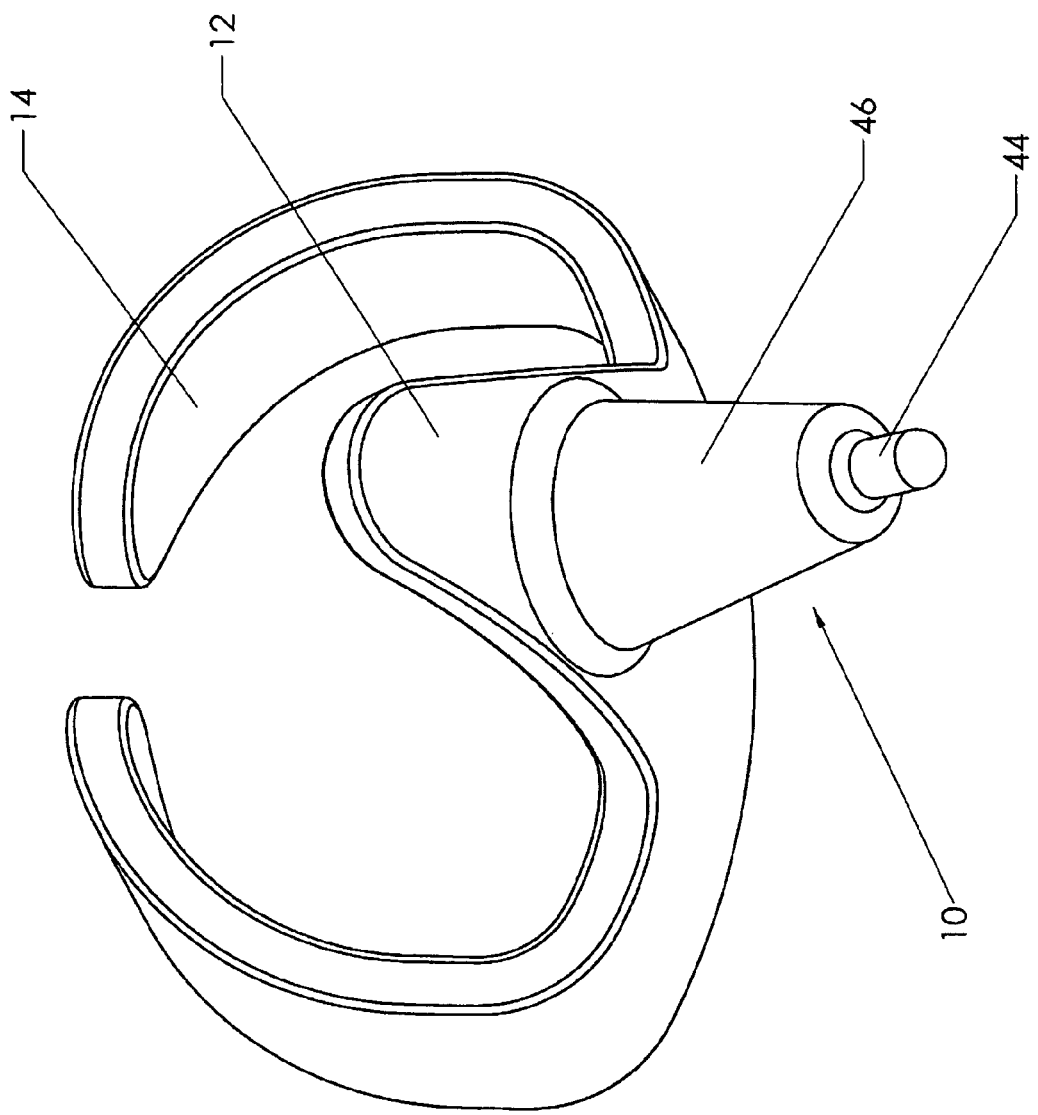
FIG. 16 is a perspective view, showing an alternative embodiment of the present invention.

For many applications a single and relatively small point of contact is desired. FIG. 16 shows an alternative embodiment of the present invention. The reader will observe that tip 10 actually narrows at its distal extreme to form nipple 44. Nipple 44 is preferably made of a non-scratching material so that it will not mar the surface of the device it is used to actuate. Those skilled in the art will know that a softer material can be overmolded on top of a harder material to form the desired arrangement. Alternatively, a softer material can be attached using frictional engagement, a mechanical interlocking engagement, or an adhesive engagement.

This alternative embodiment preferably allows the use of different tips. FIG. 16 illustrates some features facilitating the use of such tips. Tip 10 is made up of tip body 46 and nipple 44. Nipple 44 extends from the distal end of tip body 46. Nipple 44 is preferably made up of a plastic or rubber material which allows the user to contact the touch screen surface without scratching it. The overall shape of tip 10 enables different accessories to be attached to tip 10.

Figure 17:
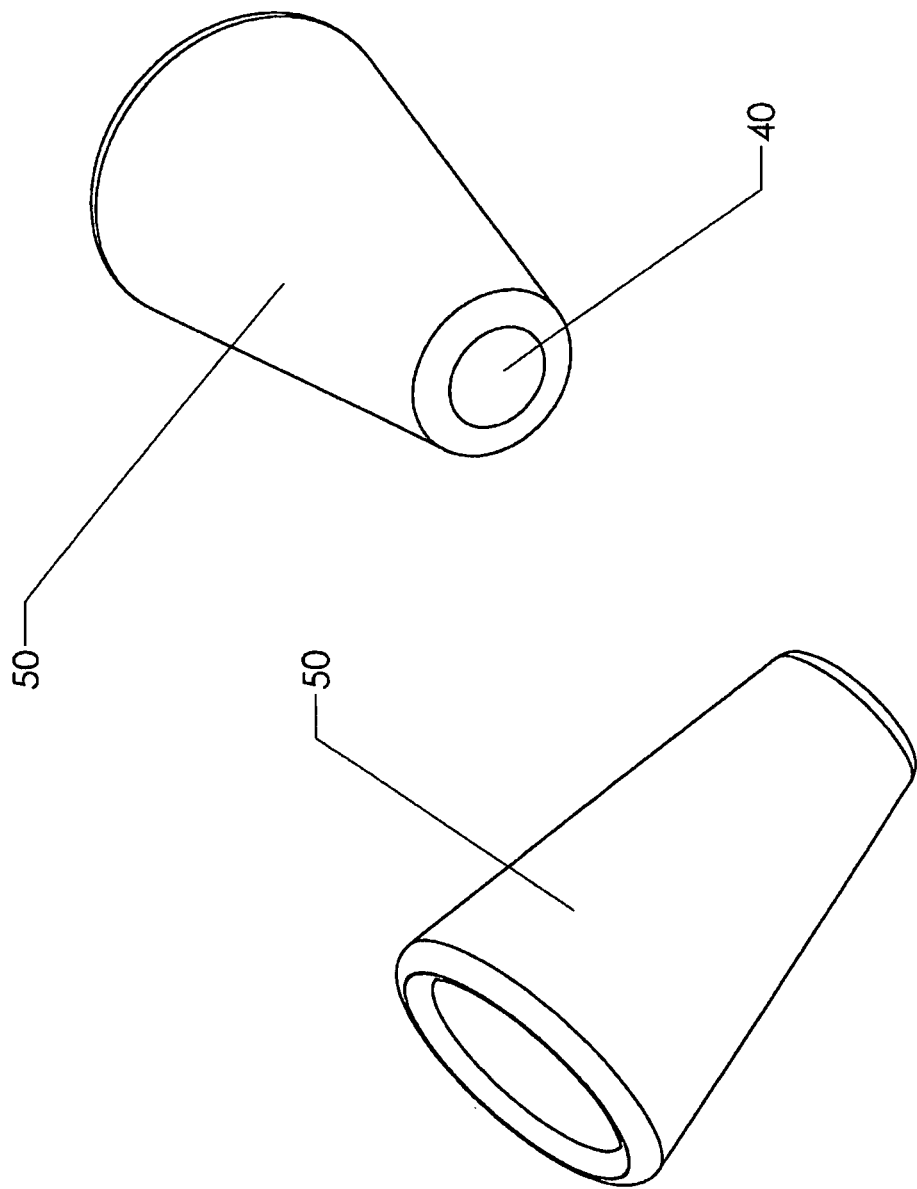
FIG. 17 is a perspective view, showing a cap with a concave cup configured to attach to the present invention.
Figure 18:
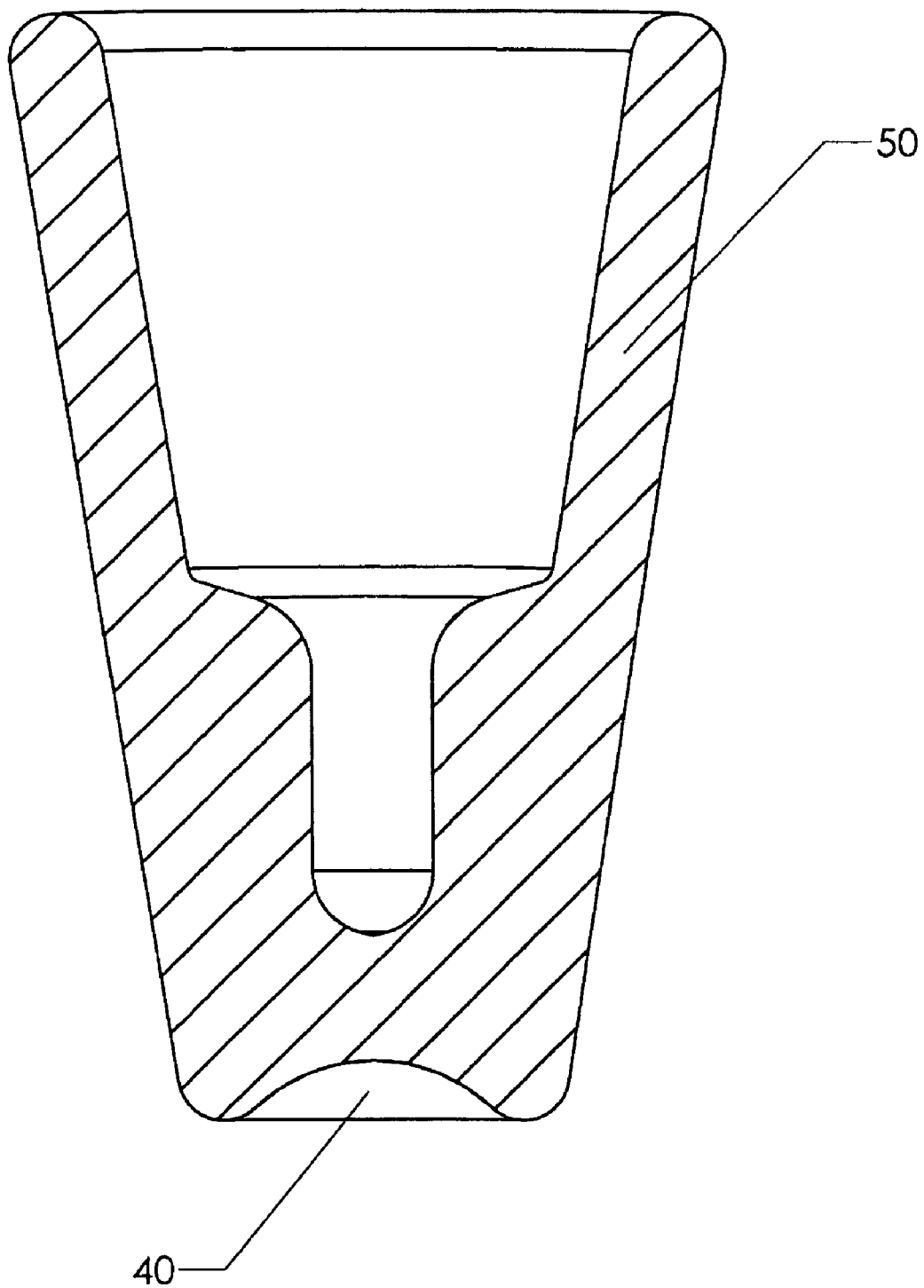
FIG. 18 is a cross section view, showing a cap with a concave cup configured to attach to the present invention.
Figure 20:
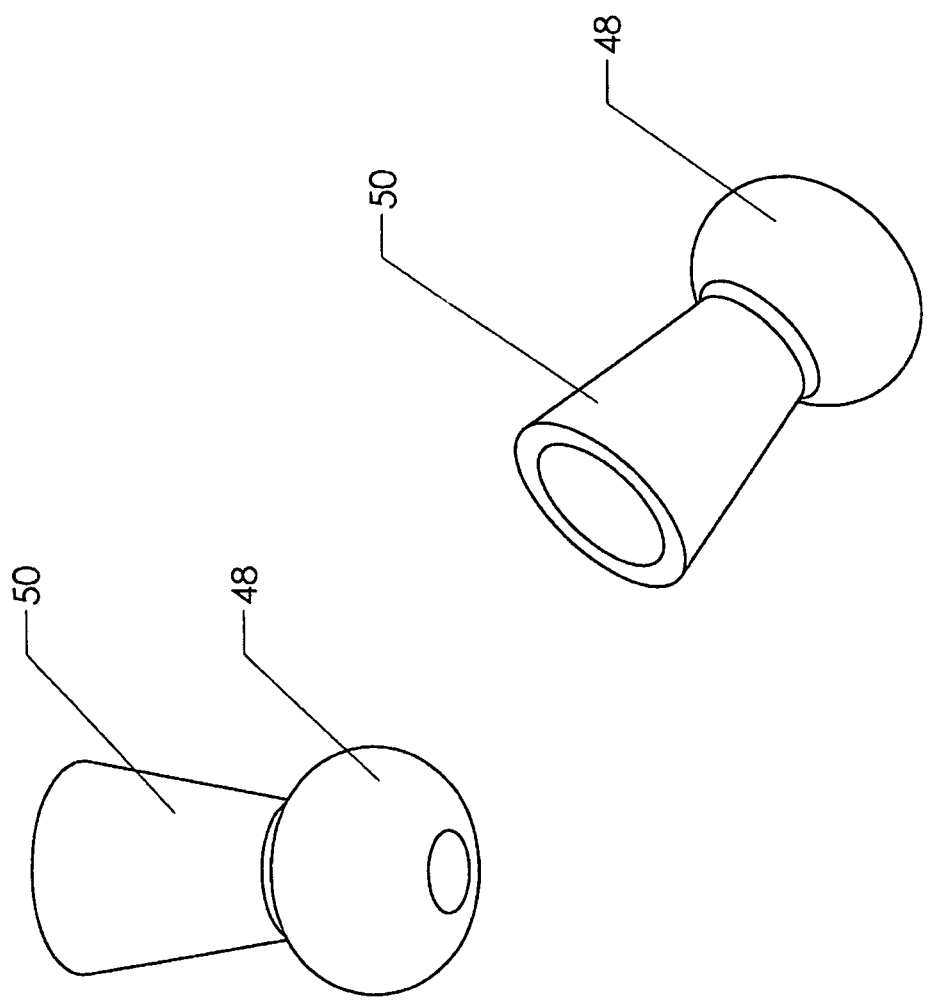
FIG. 20 is a perspective view, showing a cap with a conductive contactor configured to attach to the present invention.

In FIG. 17 and FIG. 20 two such accessories are shown. In FIG. 17 cap 50 narrows to concave cup 40. As previously shown in FIG. 13 concave cup 40 can be used to contact a domed structure. FIG. 18 shows a section view through concave cup 40, so that its shape may be more easily seen. Cap 50 also includes a receiver that slips over and engages nipple 44. A frictional engagement may be sufficient to hold the cap in place, though in some cases it is preferable to add adhesive to the joint.

Figure 19:
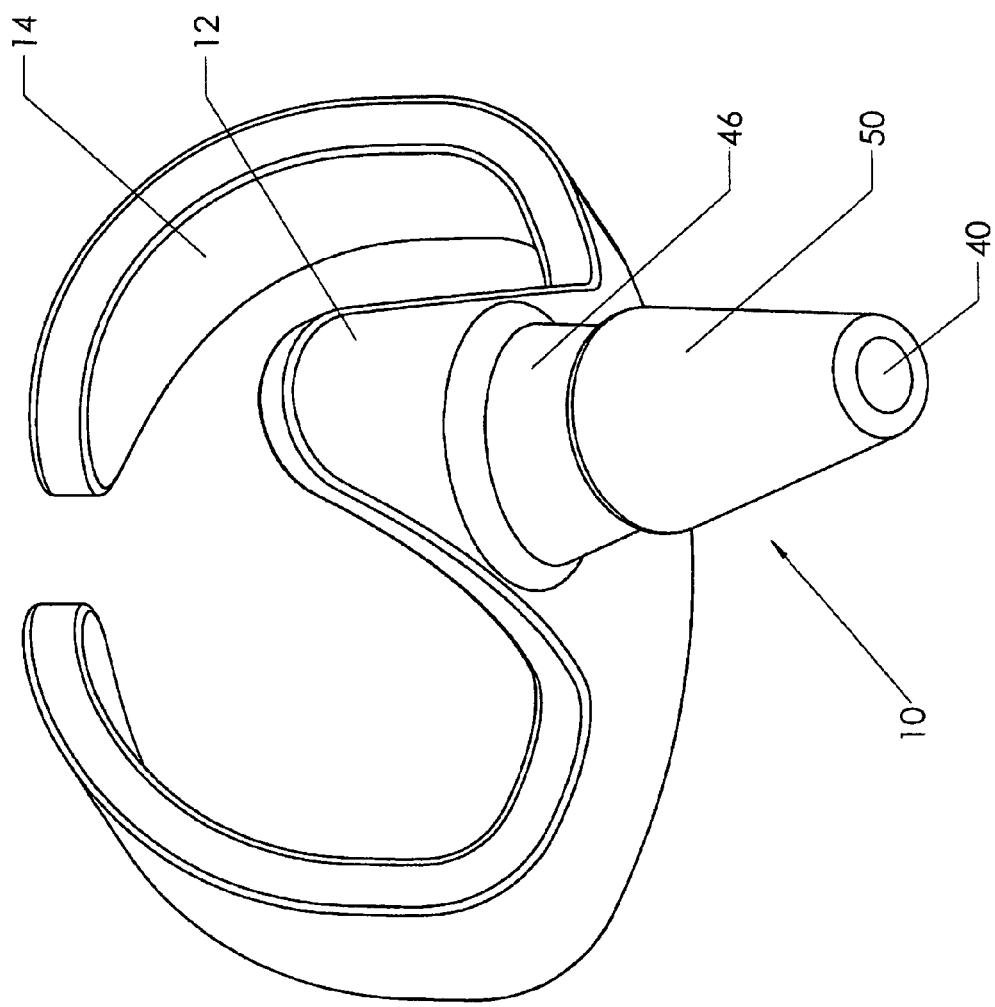
FIG. 19 is a perspective view, showing the cap with a concave cup attached to the present invention.

FIG. 19 shows the stylus with cap 50 installed on tip 10. The reader should note that the cap need not be made detachable. In fact, it is also possible to overmold cap 50 over tip 10 so that they become one integral unit. Such a version would lose the versatility of having interchangeable tips. However, since the stylus is a small and relatively inexpensive device, a user may opt to carry two or more of them (each having a particular style of tip).

FIG. 20 shows a different type of tip which is specifically configured for use with a capacitive touch screen. A capacitive touch screen presents unique challenges because in order for it to be actuated by a device touching it, the device must be (1) at least somewhat conductive; and (2) able to bridge a distance across the capacitive touch screen. The conductivity must be at least comparable to human skin (though it can be greater). The term "conductive" in this context should be understood to mean a conductivity at least as great as the conductivity of human skin under poor conditions. The distance to be bridged ranges from a minimum of about 2 mm to a maximum of about 20 mm. In other words, a single point of contact will not work.

Of course, one goal of the alternative embodiment of the present invention is to provide rapid actuation of a capacitive touch screen. A rigid, planar contacting device will not work well for this, since the user would have to carefully align the plane of the contacting device with the plane of the touch screen. This cannot be done rapidly. In fact, the human finger tip provides a good model for the type of contacting device needed. The human finger tip is (1) at least mildly conductive; and (2) sufficiently pliable to flatten across a sufficient distance when pressed against a capacitive touch screen. The human finger tip essentially creates a conductive bridge from one portion of a touch screen to the other. The touch screen senses the presence of this conductive bridge and this fact allows the user to interact with the touch screen.

Figure 21:
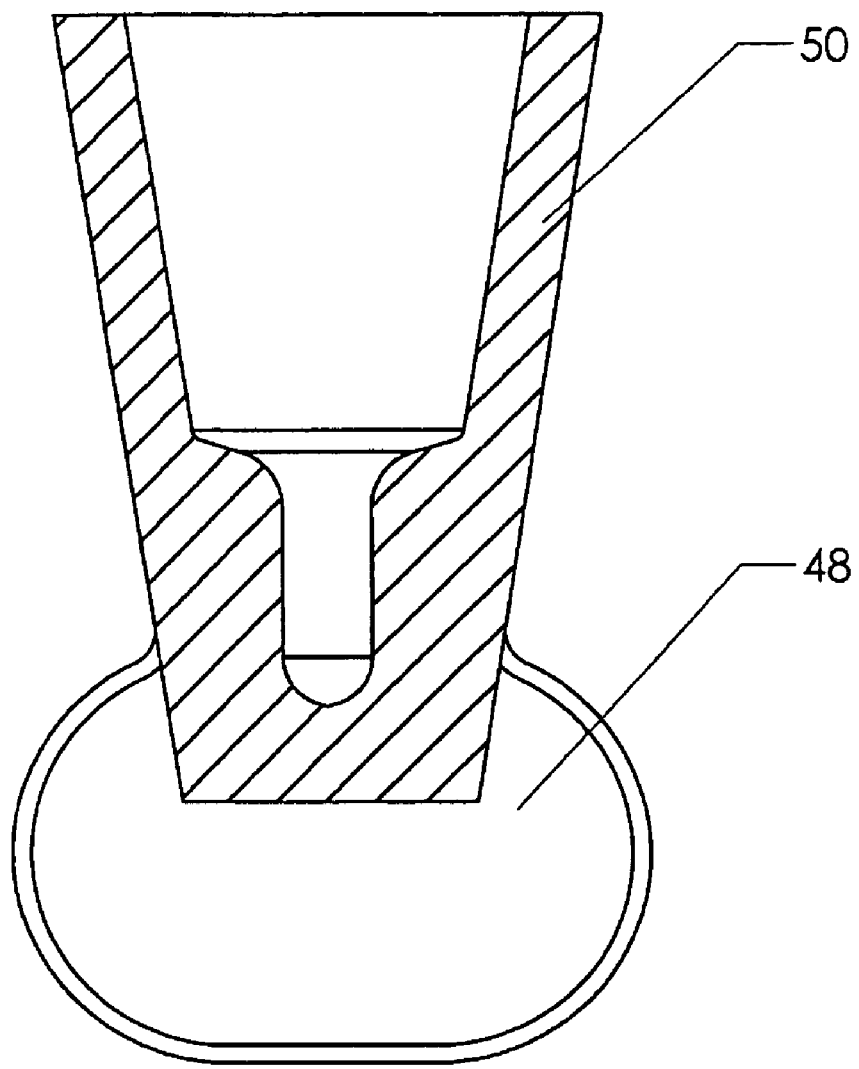
FIG. 21 is a sectional view of the cap with a conductive contactor.

The device shown in FIG. 20 is pliable and has a conductive exterior. It includes a cap 50 with an attached conductive contactor 48. FIG. 21 shows a section view through the cap and the conductive contactor. The reader will observe that cap 50 includes internal features designed to slide over and engage tip body 46 and nipple 44 shown in FIG. 16. Returning to FIG. 21, the reader will observe that conductive contactor 48 covers the distal end of cap 50.

Figure 21B:
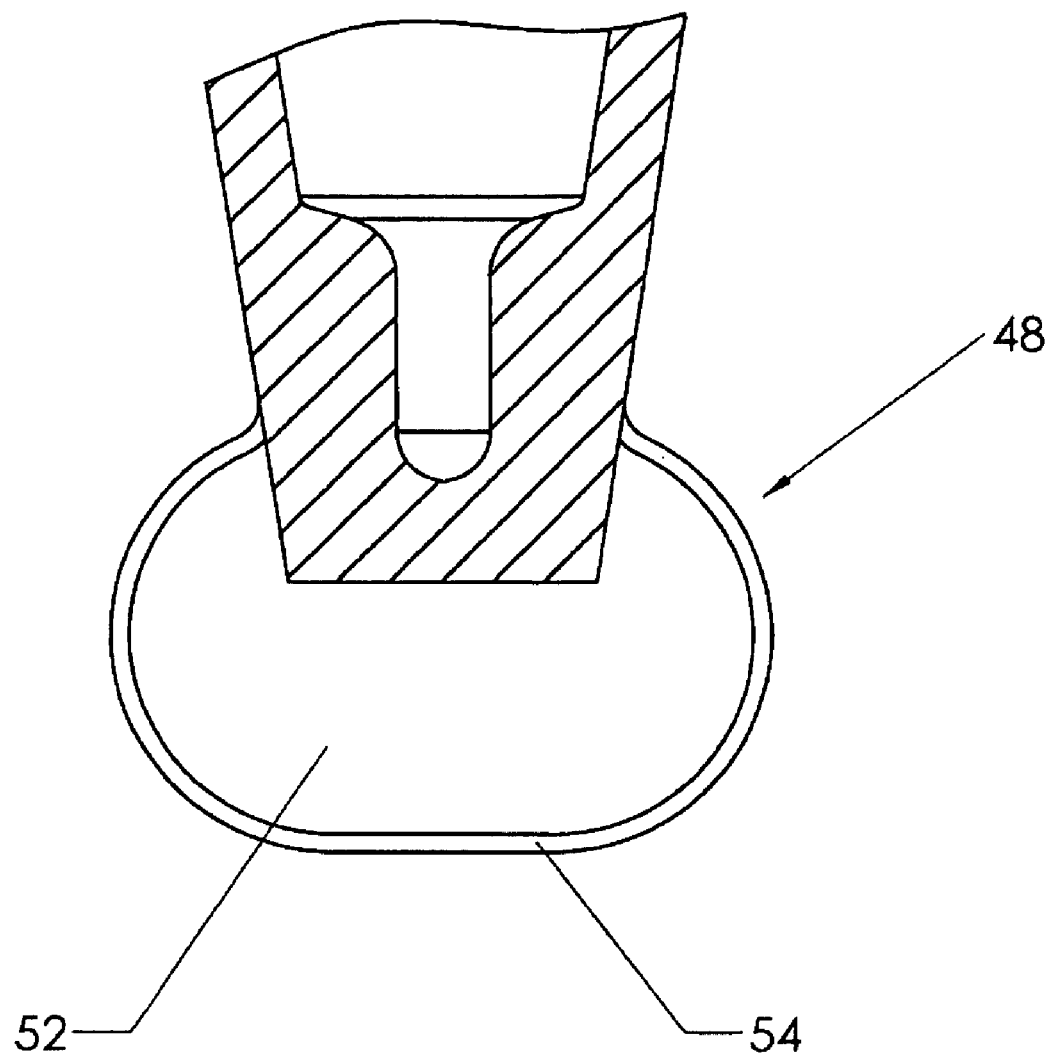
FIG. 21B is a more detailed sectional view of the conductive contactor, showing the use of a resilient material covered by a pliable conductive layer.

FIG. 21B is a more detailed view of the same cross section. The conductive contactor can be made of many different materials. One good approach is to use a resilient material 52 covered by pliable conductive layer 54. A good example of a suitable resilient material would be silicone or neoprene sponge. The conductive layer can be a mesh of fine conductive wires. As an example, Custom Shielding of Gilbert, Ariz., makes a mesh material of tin-plated bronze wires. Each wire has a diameter of about 0.005 inches and the mesh is created of wires spaced between about 0.010 inches and 0.050 inches apart.

A second approach is to use a spherical mass of pliable conductive wires, similar to very fine steel wool. Steel wool itself would not be preferable, since it would tend to corrode and might possibly abrade the touch screen surface. A mass of small copper wires would be preferable. The mass of fine wires would be attached to cap 50. The mass comprises interlocked and kinked strands, so that every strand is electrically connected to every other strand. The wires are very fine, so that the mass can easily deform when pressed against a solid object such as a capacitive touch screen.

Figure 22:
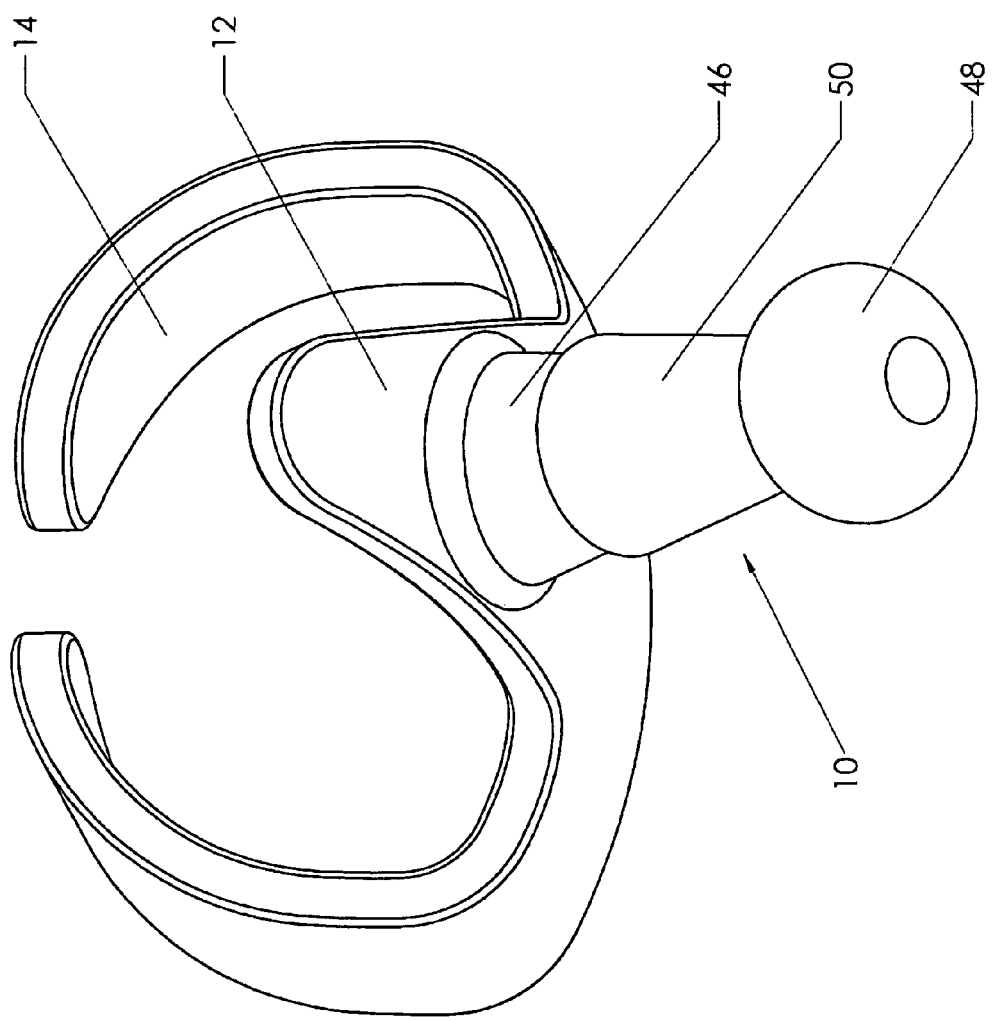
FIG. 22 is a perspective view, showing the cap with a conductive contactor configured to attach to the present invention.

FIG. 22 shows conductive contactor 48 and cap 50 installed on a stylus. The reader should note that it is certainly possible to attach the conductive contactor directly to tip 10 without utilizing a separate cap. However, the use of a cap can be advantageous since it allows different contactors to be placed on a single tip. The conductive contactor shown in FIG. 22 can be the composite type as detailed in FIG. 21B, or alternatively a mass of interwoven conductive wires in the shape shown.

Figure 23:
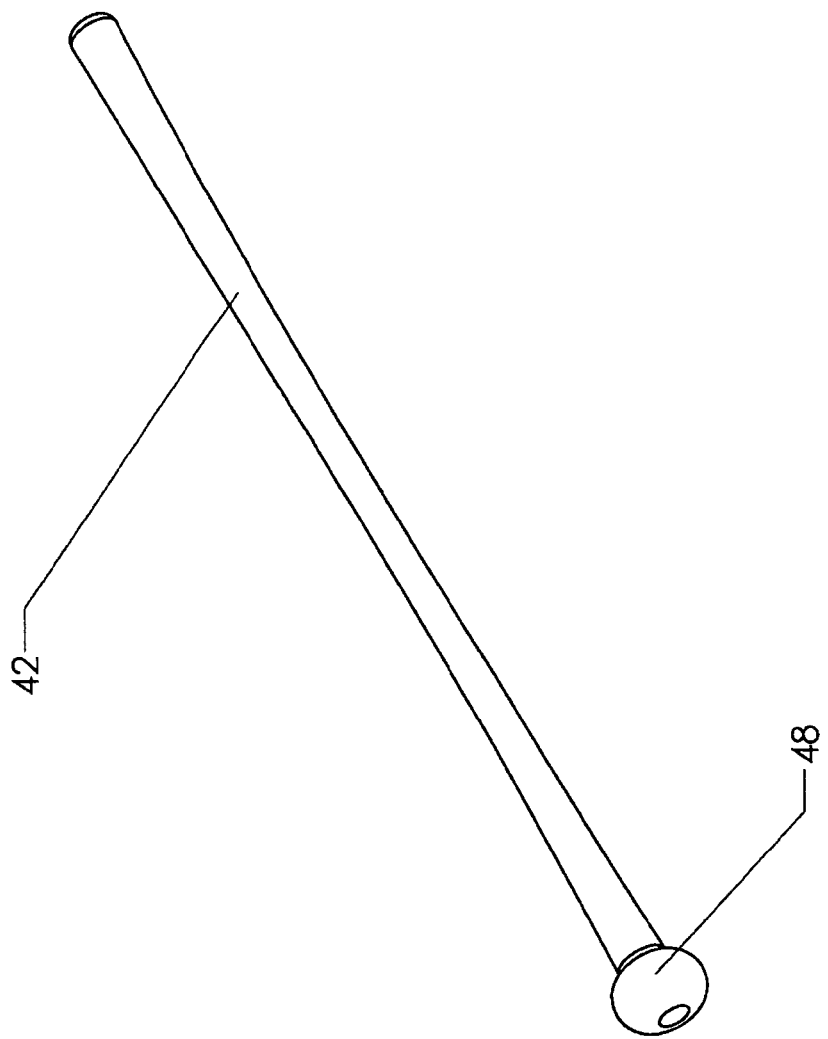
FIG. 23 is a perspective view, showing a prior art stylus incorporating a conductive contactor on its tip.

In FIG. 23 conductive contactor 48 is shown located at the end of a conventional stylus pen. The same types of conductive contactor can be applied to such a conventional stylus, using the structures disclosed in FIGS. 20-22. However, this device is not within the claims of the present invention.

Figure 24:
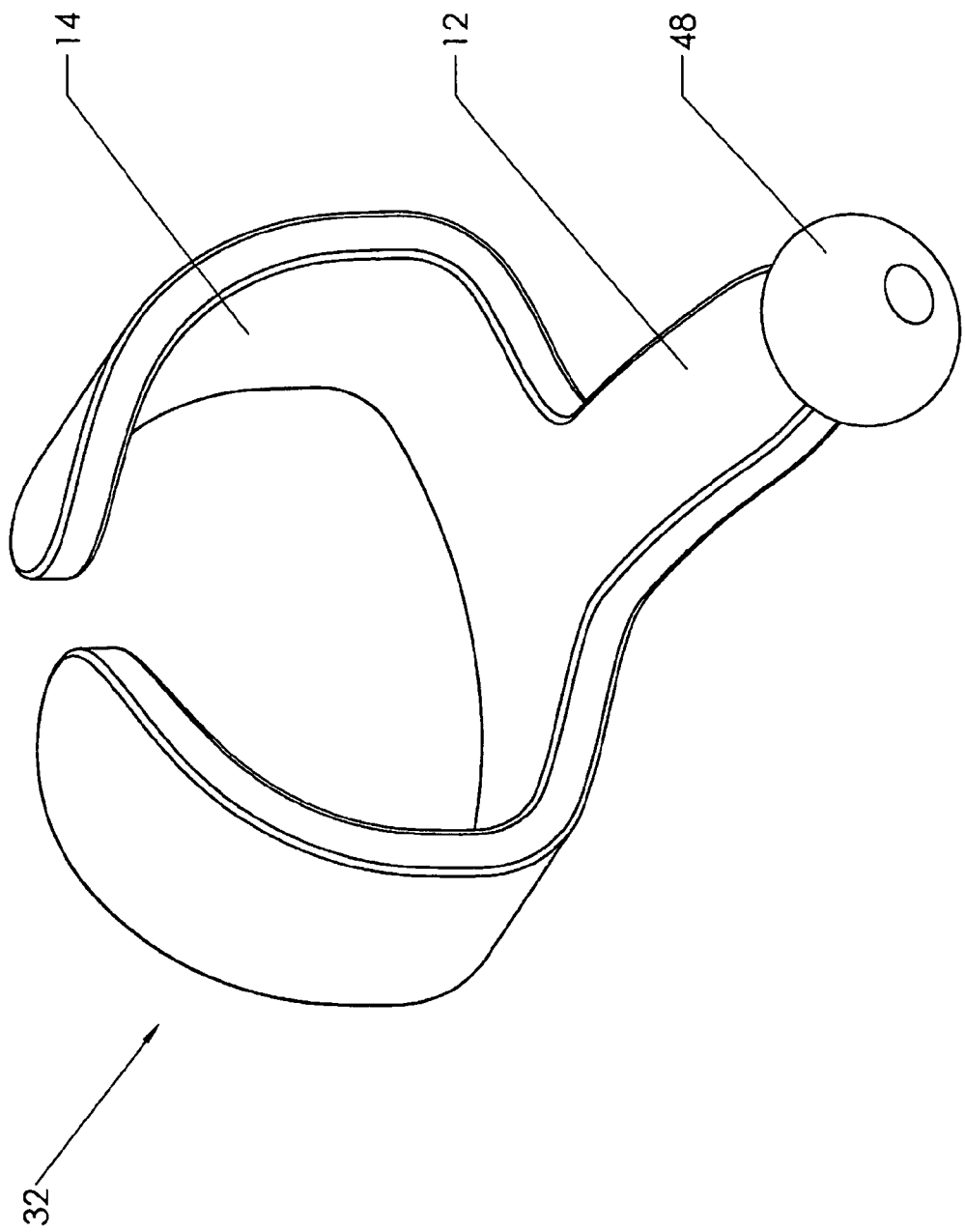
FIG. 24 is a perspective view, showing a stylus with a conductive contactor attached to a tongue.

FIG. 24 illustrates an embodiment in which the conductive contactor is attached directly to a tongue. This embodiment includes a wrap 14 and a tongue 12 extending away from the wrap. Conductive contactor 48 is attached to the distal end of the tongue. Again, the conductive contactor can be any material (or a composite of multiple materials) which is both pliable and conductive. The tongue is shown extending away from the wrap in a direction which descends somewhat from the central axis of the wrap. This angle may be adjusted appropriately to suit user preferences. It could range from descending directly downward toward the hand-held device and away from the user's digit to ascending somewhat upward. The conductive contactor could also be placed on any of the tips shown in the embodiments illustrated in FIGS. 1-15.

Figure 25:
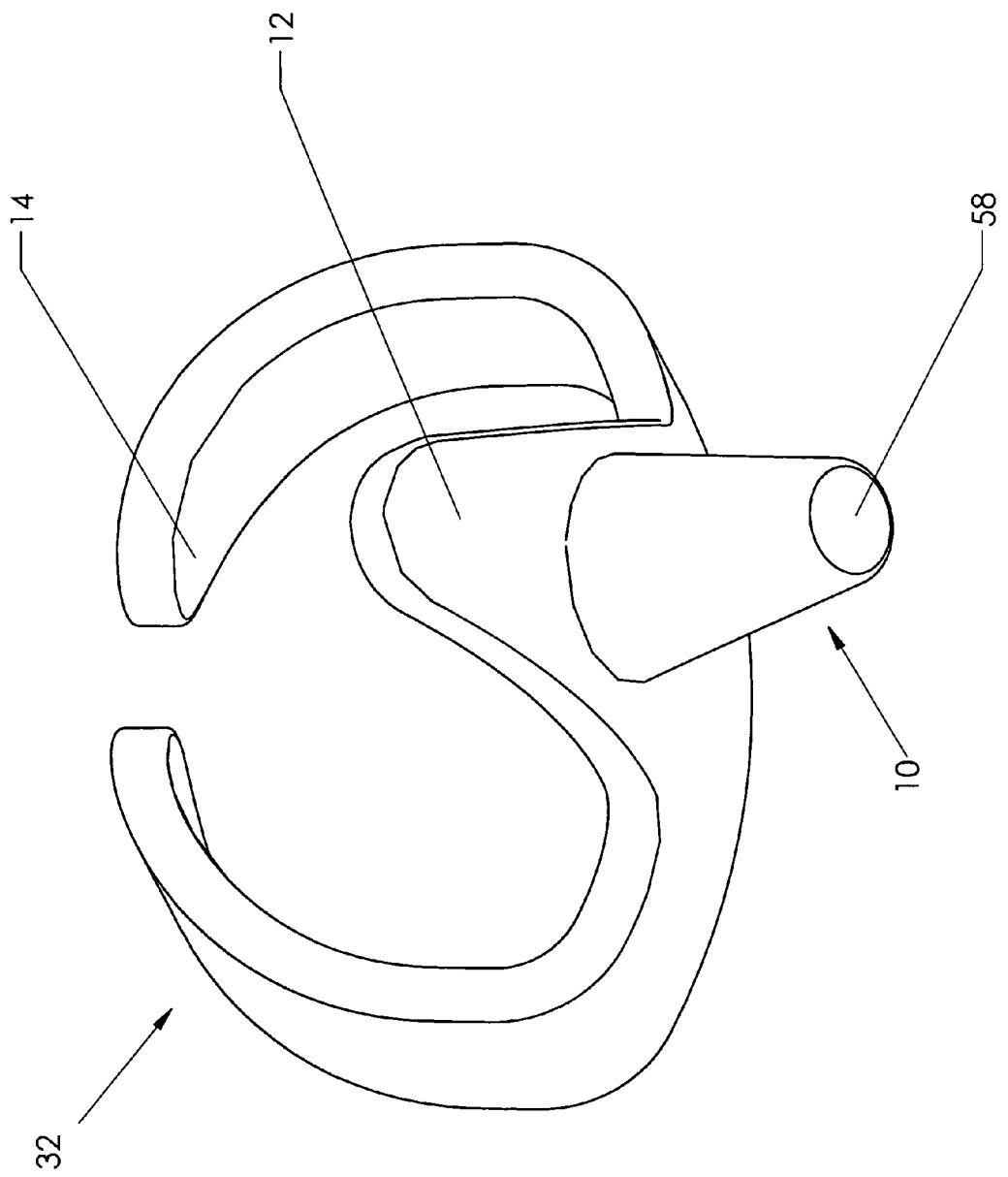
FIG. 25 is a perspective view, showing the present invention.
Figure 26:
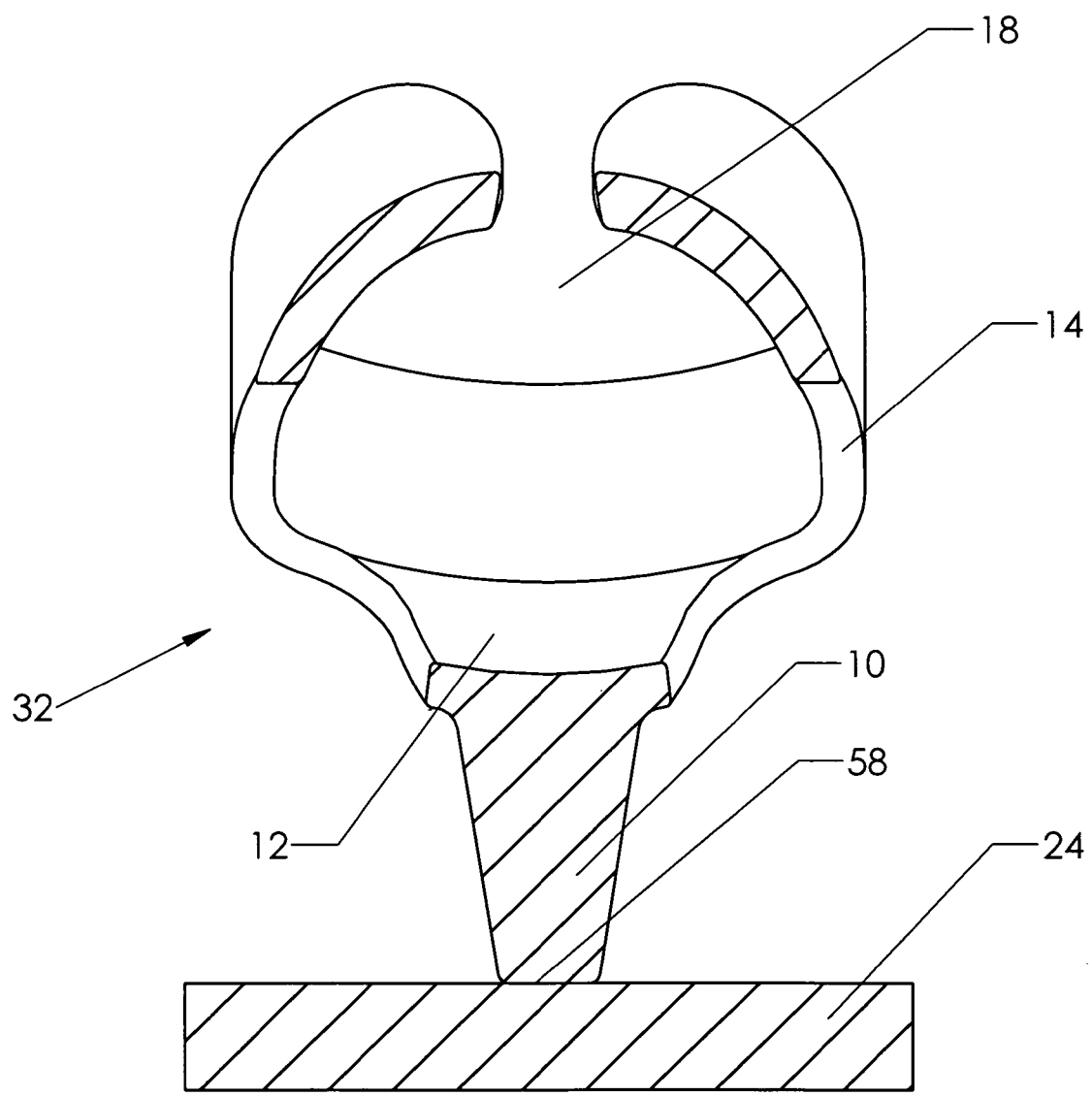
FIG. 26 is a cross-section view, showing the present invention against a touch-screen device.
Figure 27A:
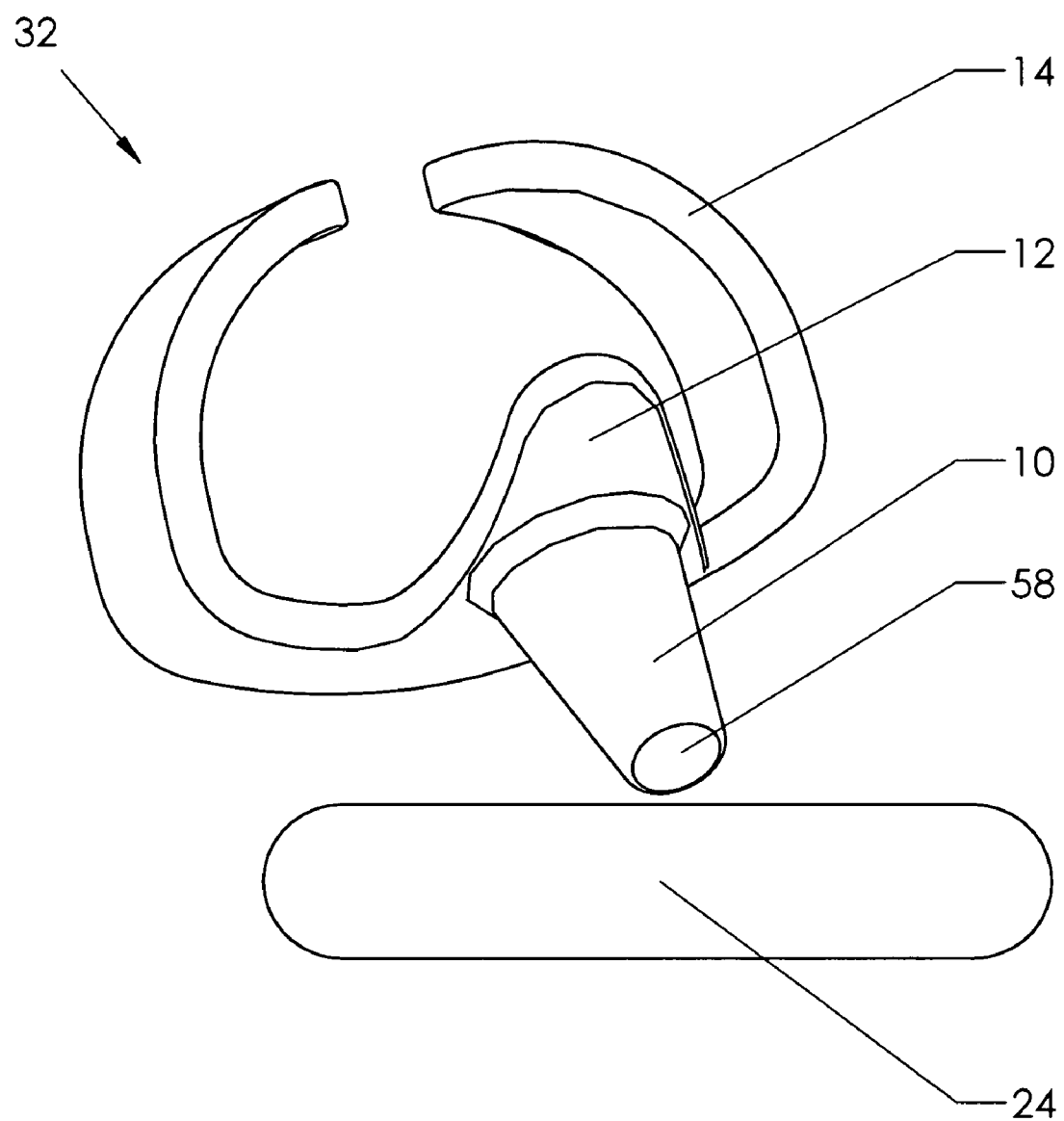
FIG. 27A is a perspective view, showing the present invention angled away from a touch-screen device.
Figure 27B:
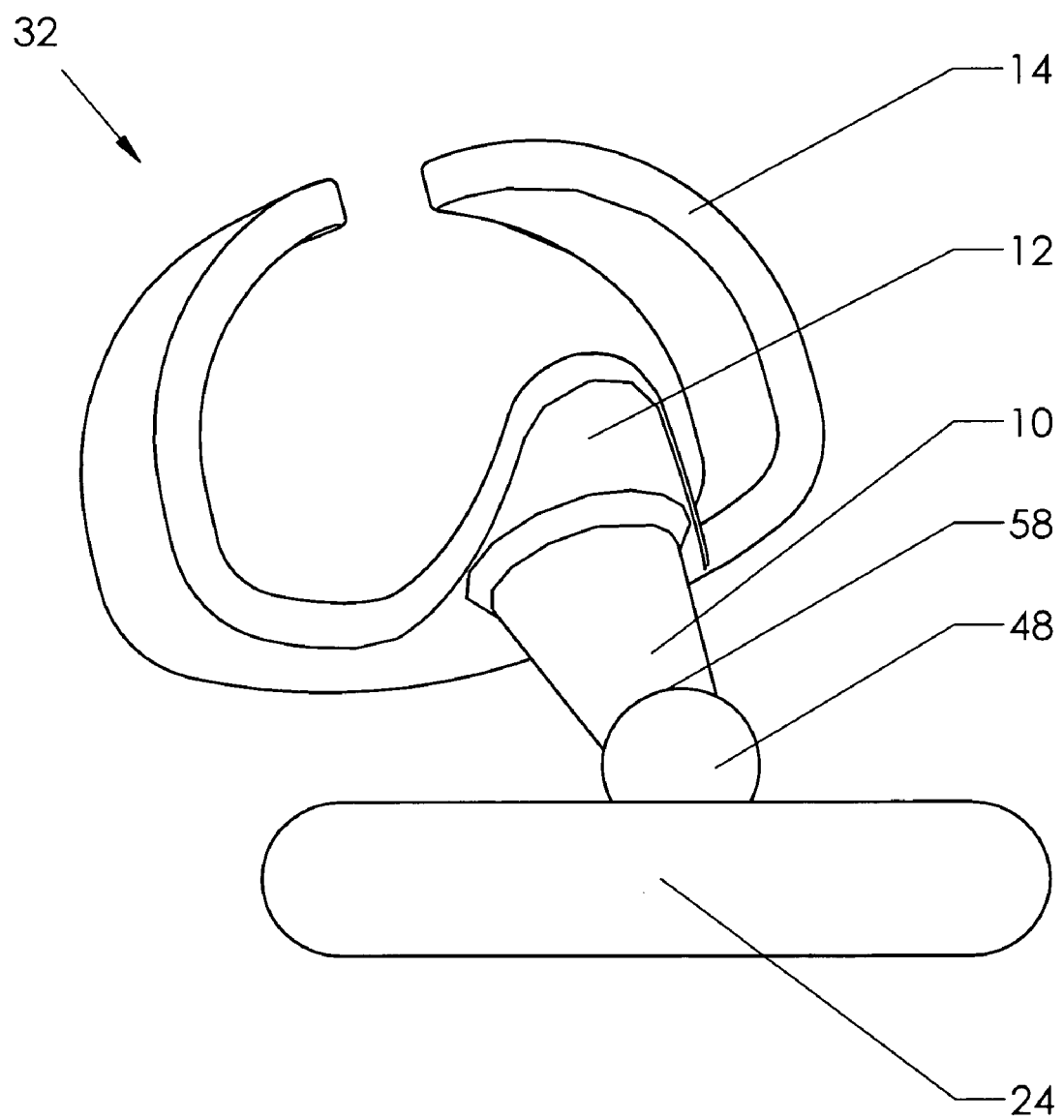
FIG. 27B is a perspective view, showing the preferred embodiment of the present invention against a touch-screen device.

The present invention focuses on the ability of the stylus to create a conductive connection between the user's digit and the touch-screen device. FIG. 25 shows one embodiment of the present invention. In this embodiment of the present invention stylus 32, including wrap 14, tongue 12 and tip 10 are made of a pliable and conductive material. As an example, PolyOne Corporation, of Cleveland, Ohio, creates a line of materials called STAT-TECH® Electrically Conductive Compounds, which are specifically engineered to allow low-to-high levels of conductivity. It is desirable for the present invention to have some degree of elasticity, therefore the Elastomeric Stat-Tech compounds, from the Stat-Tech® rigid resin family would be preferred. In order for bridge surface 58 of tip 10 to effectively bridge the connection between the touch-screen device and the user's digit, bridge surface 58 of tip 10 must have a diameter between 2 mm and 20 mm, having a preferable diameter of 5 mm. FIG. 25 shows bridge surface 56 as a flat planar surface. In order to create a conductive connection between touch-screen 24 and the user's digit 18, it is desirable that bridge surface 58 is flat against the surface of touch-screen 24 as shown in the cross-section view in FIG. 26. However, as shown in FIG. 27A the flat, planar bridge surface 58 can lift from touch-screen 24 easily, creating a break in the conductive connection. Therefore FIG. 27B shows conductive contactor 48 attached to bridge surface 58. Conductive contactor 48 is described and illustrated above, specifically in FIG. 20 through FIG. 24. As described above, conductive contactor 48 should be made of a softer, resilient material that deforms as it is pressed against touch screen 24 in order to flatten across a sufficient distance when pressed against a capacitive touch screen.

Figure 28A:
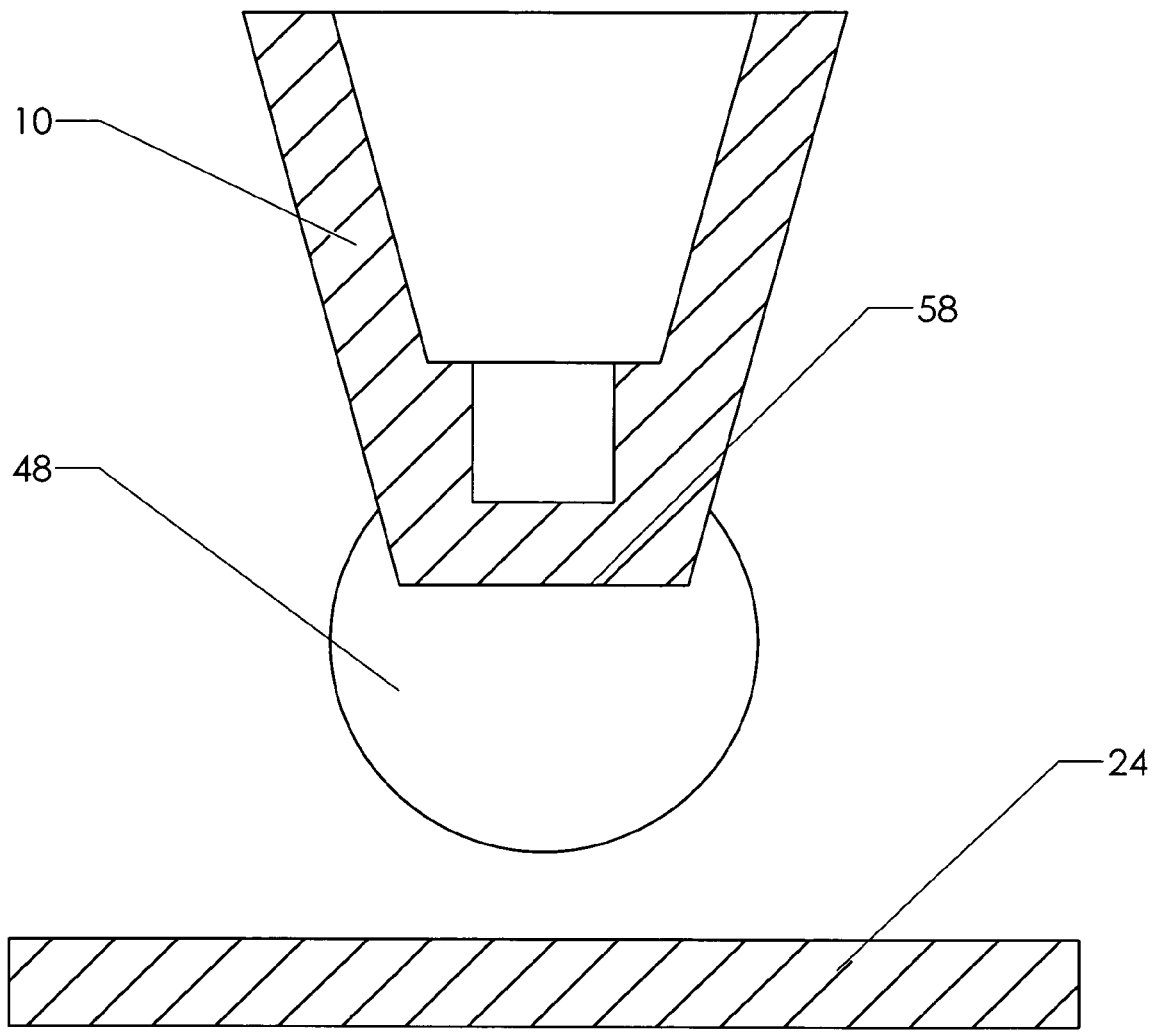
FIG. 28A-FIG. 28C are cross section views, showing the preferred embodiment of the present invention in different positions relative to a touch-screen device.
Figure 28B:
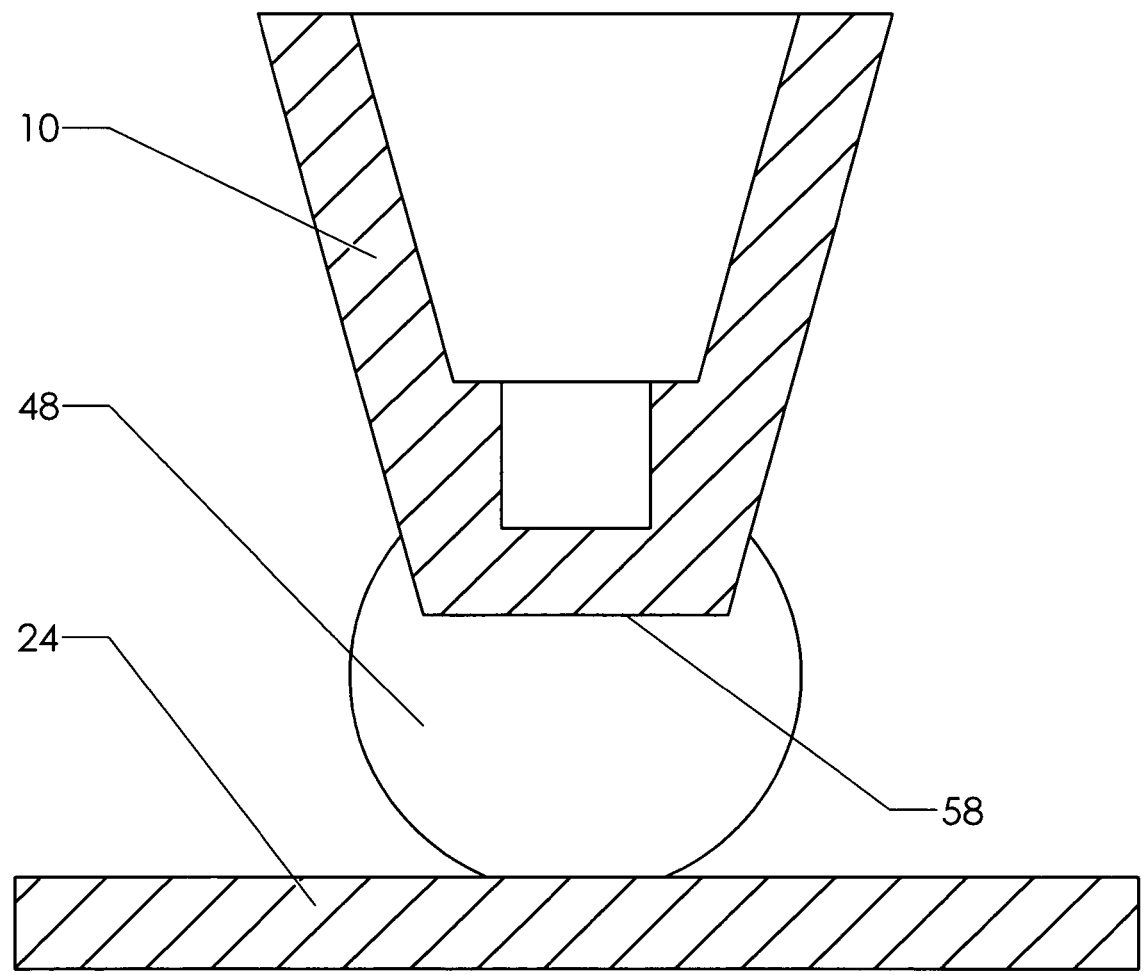
Figure 28C:
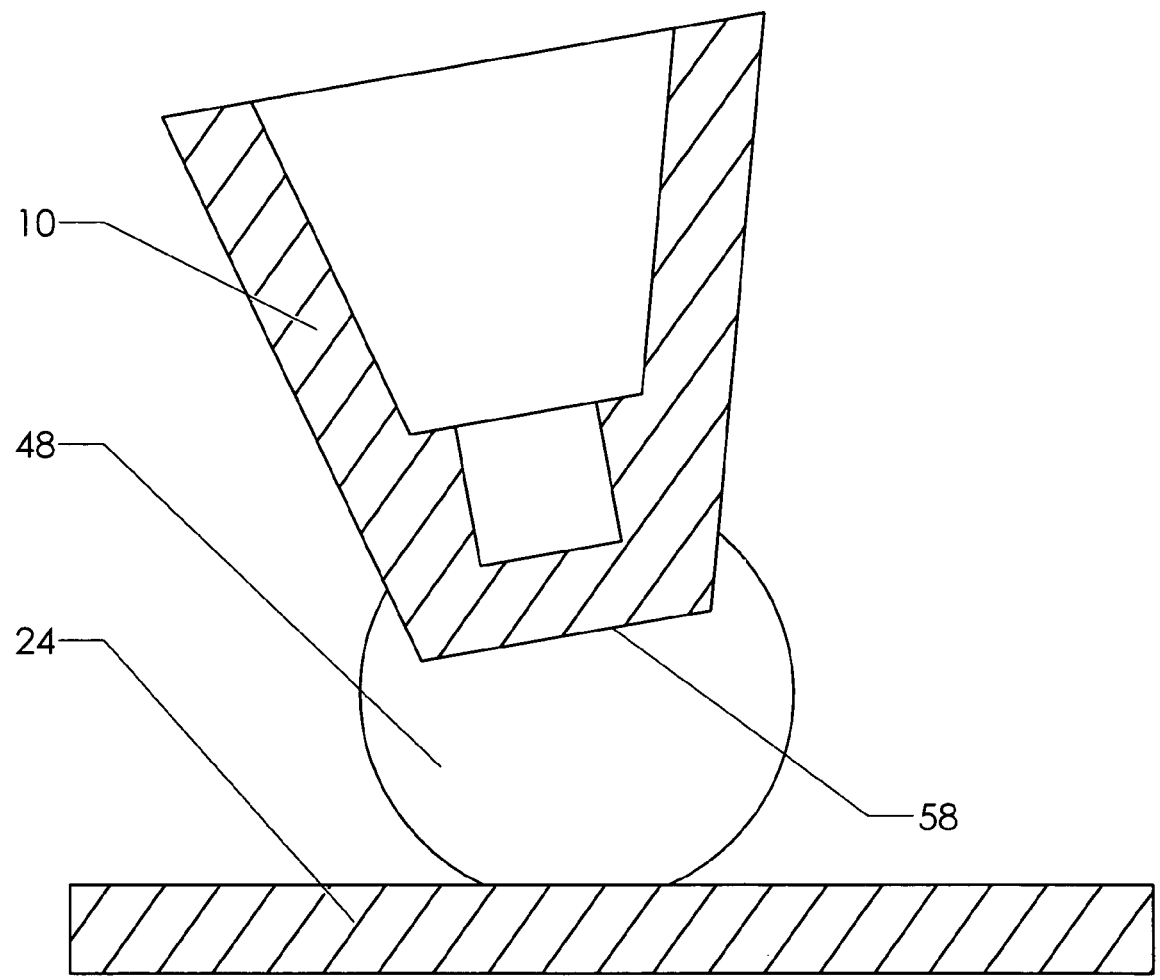

In the present embodiment the conductive contactor 48 should also be conductive. It is essential that the present invention include a conductive connection which stems from the touch screen to the user's digit. In the present embodiment of the invention the conductive contactor 48 accepts charge from the touch-screen 24 at a particular point on the touch-screen and transmits the charge through the tip 10 and tongue 12 to the user's digit. The change in charge on the surface of the touch-screen at a particular point along the touch-screen's grid is sensed by the touch-screen device thereby allowing the device to respond. FIG. 28A shows a cross section of conductive contactor 48 attached directly to bridge surface 58 of tip 10. FIG. 28B illustrates the deformable nature of conductive contactor 48 as user presses down against touch-screen 24. FIG. 28C shows tip 10 being angularly displaced from the touch screen surface without losing the conductive connection between touch-screen 24 and conductive contactor 48.

Figure 30A:
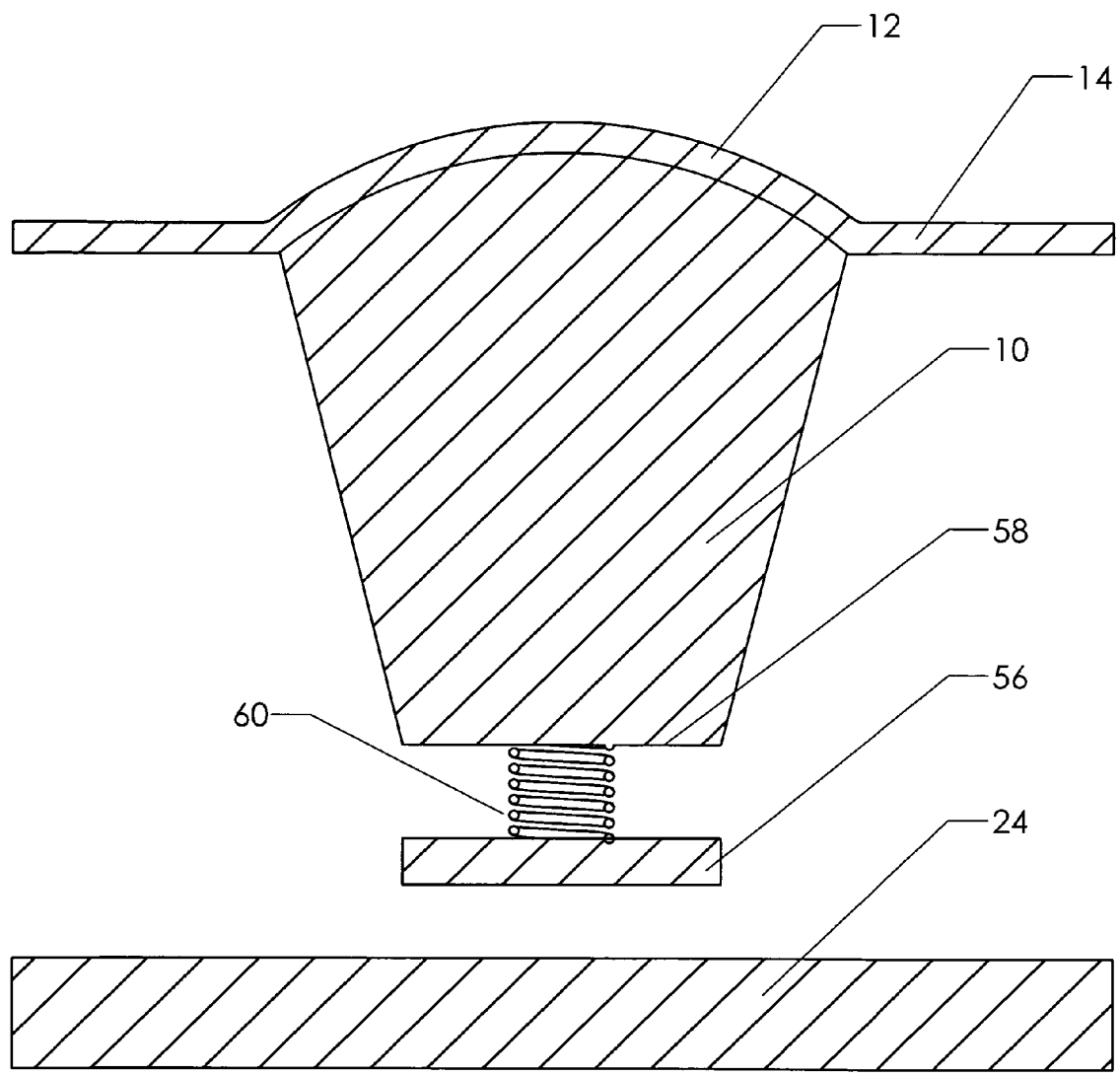
FIG. 30A-FIG. 30C are cross section views, showing an alternative embodiment of the present invention in different positions relative to a touch-screen device.
Figure 30B:
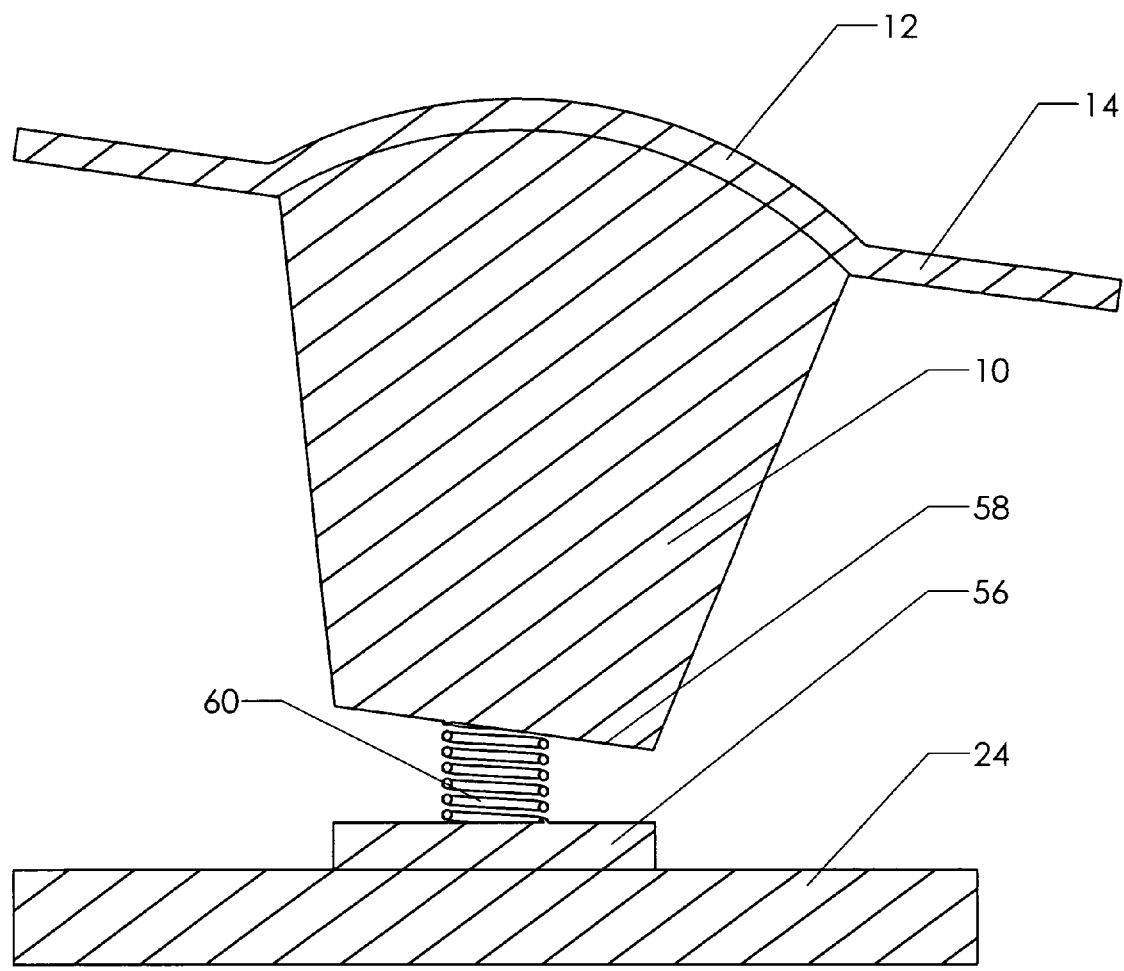
Figure 30C:
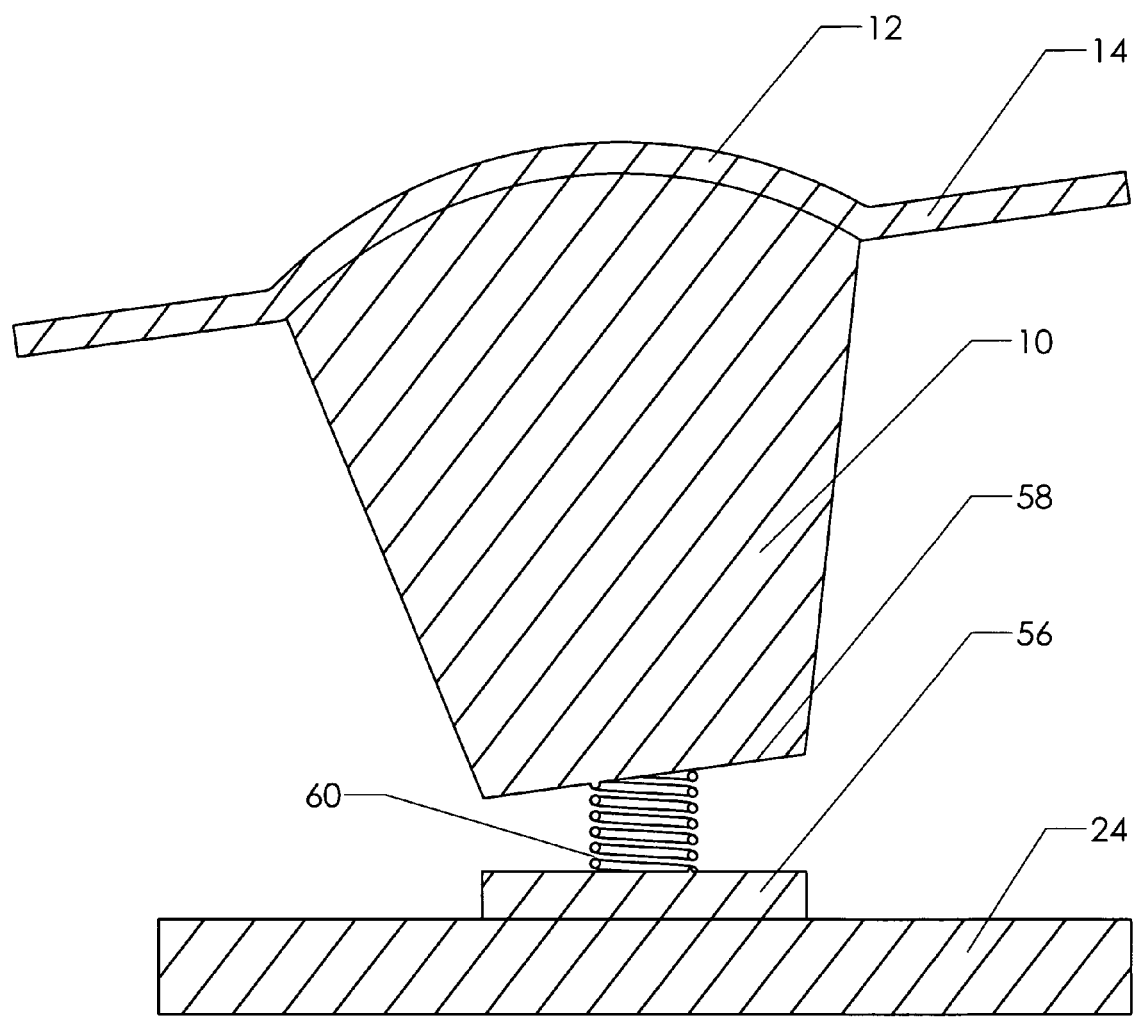

FIG. 29 illustrates another embodiment of the present invention where contact disc 56 is connected to bridge surface 58 and tip 10 by way of spring 60. Spring is preferably connected between the center of contact disc 56 and the center of bridge surface 58. FIG. 30A shows a cross-section of the present embodiment, with a wrap 14, tongue 12, tip 10, spring 60 and contact disc 56 all made up of a conductive material. When stylus is in this position, pulled away from touch-screen 24, spring 60 ensures that contact disc 56 returns to a central location, parallel to bridge surface 58. A uniform position of contact disc 56 in relation to stylus 32 allows user to easily position contact disc 56 against touch-screen 24 when it is necessary to use stylus 32 again. Contact disc 56 is shown in FIG. 30B and FIG. 30C fully contacting touch-screen 24 even when tip 10 and wrap 14 tilt with respect to touch-screen 24 to one side or the other.

Figure 31:
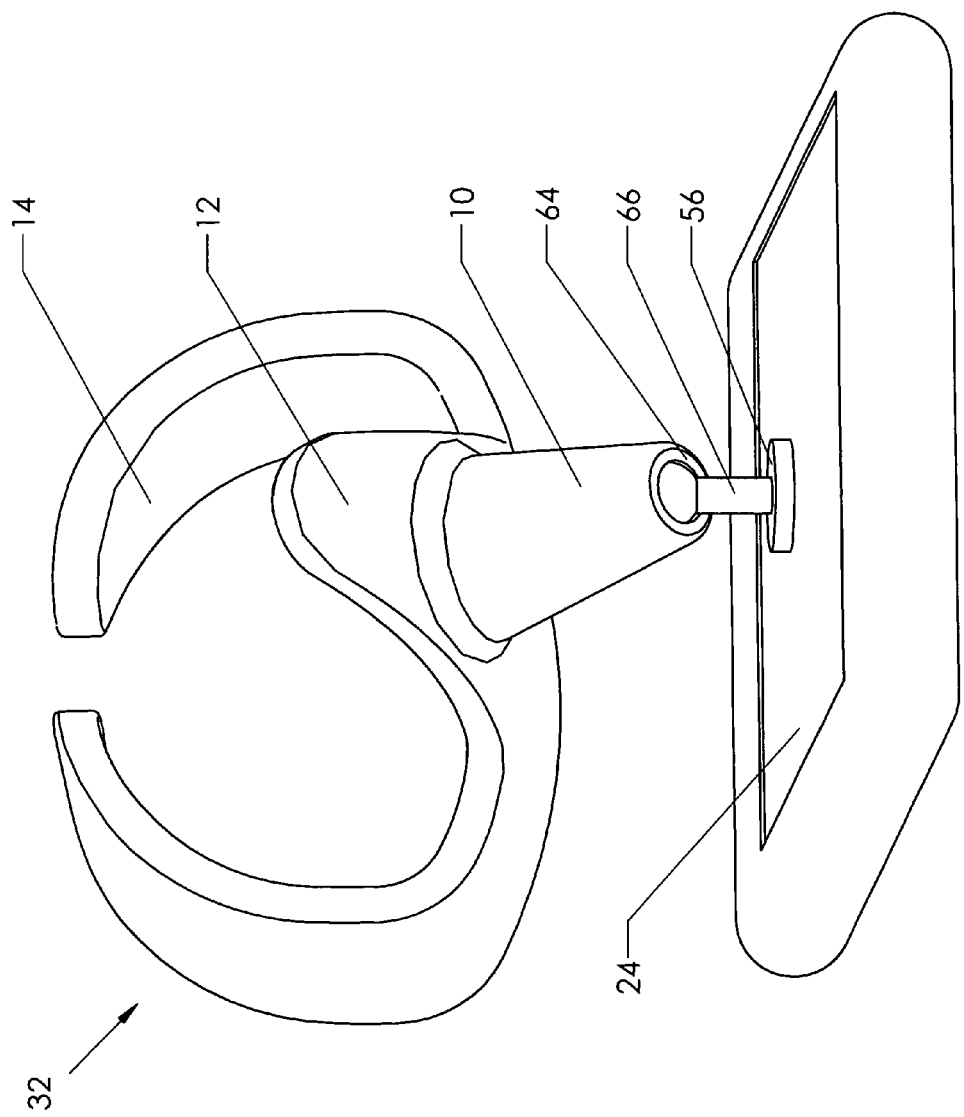
FIG. 31 is a perspective view, showing an alternative embodiment of the present invention against a touch-screen device.
Figure 32A:
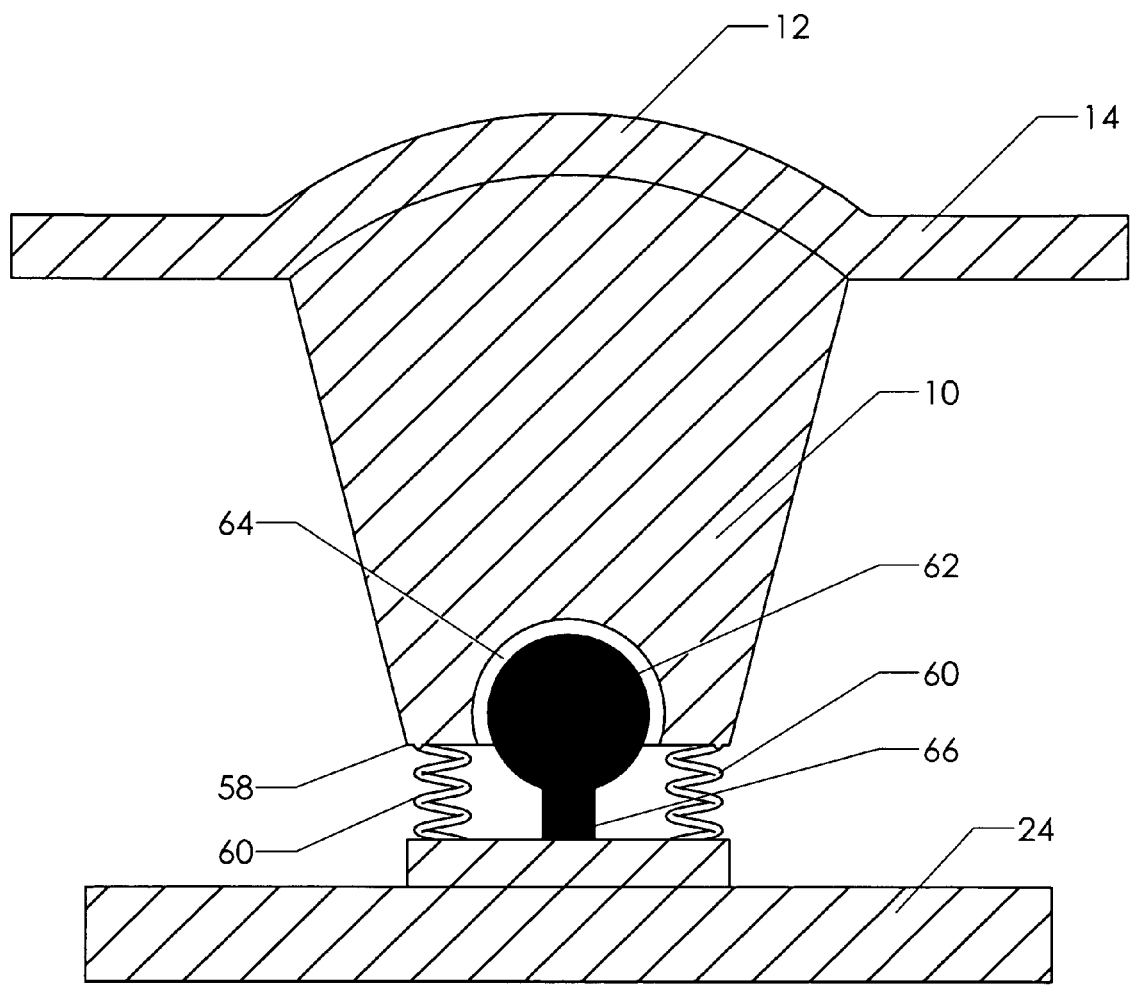
FIG. 32A and FIG. 32B are cross section views, showing an alternative embodiment of the present invention in different positions relative to a touch-screen device.
Figure 32B:
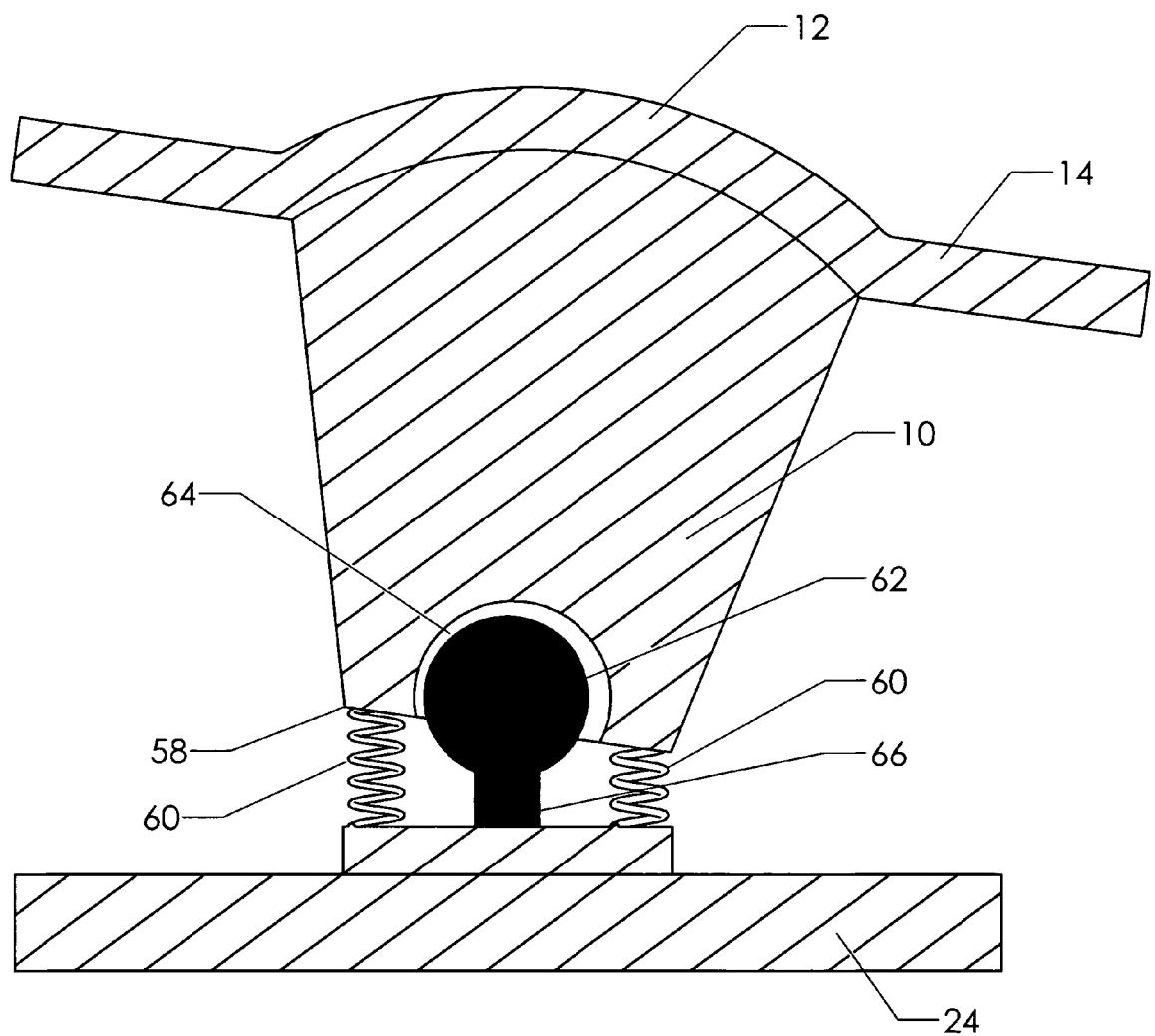

FIG. 31 shows another embodiment also employing contact disc 56 which moves angularly with respect to tip 10 of stylus 32. In this embodiment the contact disc 56 is connected to a stem 66 and ball 62 (not shown) which rotates within a socket 64. FIG. 32A and FIG. 32B illustrates the operation of the present embodiment with respect to touch screen 24. Two springs 60 reach from contact disc 56 to a circumferential point on bridge surface 58. Springs 60 again ensure that contact disc 56 returns to a centrally located position parallel to bridge surface 58 of tip 10 when stylus 32 is pulled away from touch-screen 24.

Figure 33:
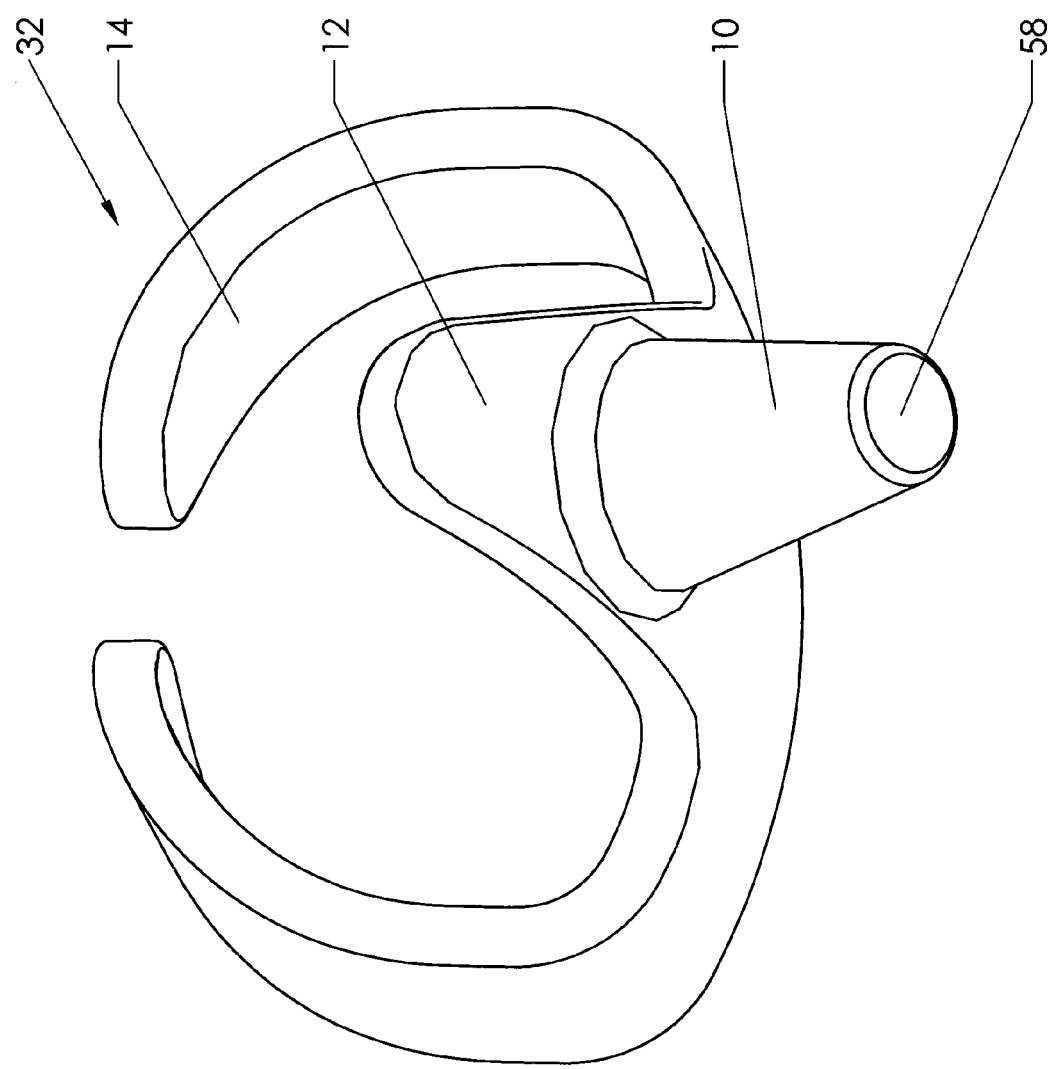
FIG. 33 is a perspective view, showing an alternative embodiment of the present invention.
Figure 34:
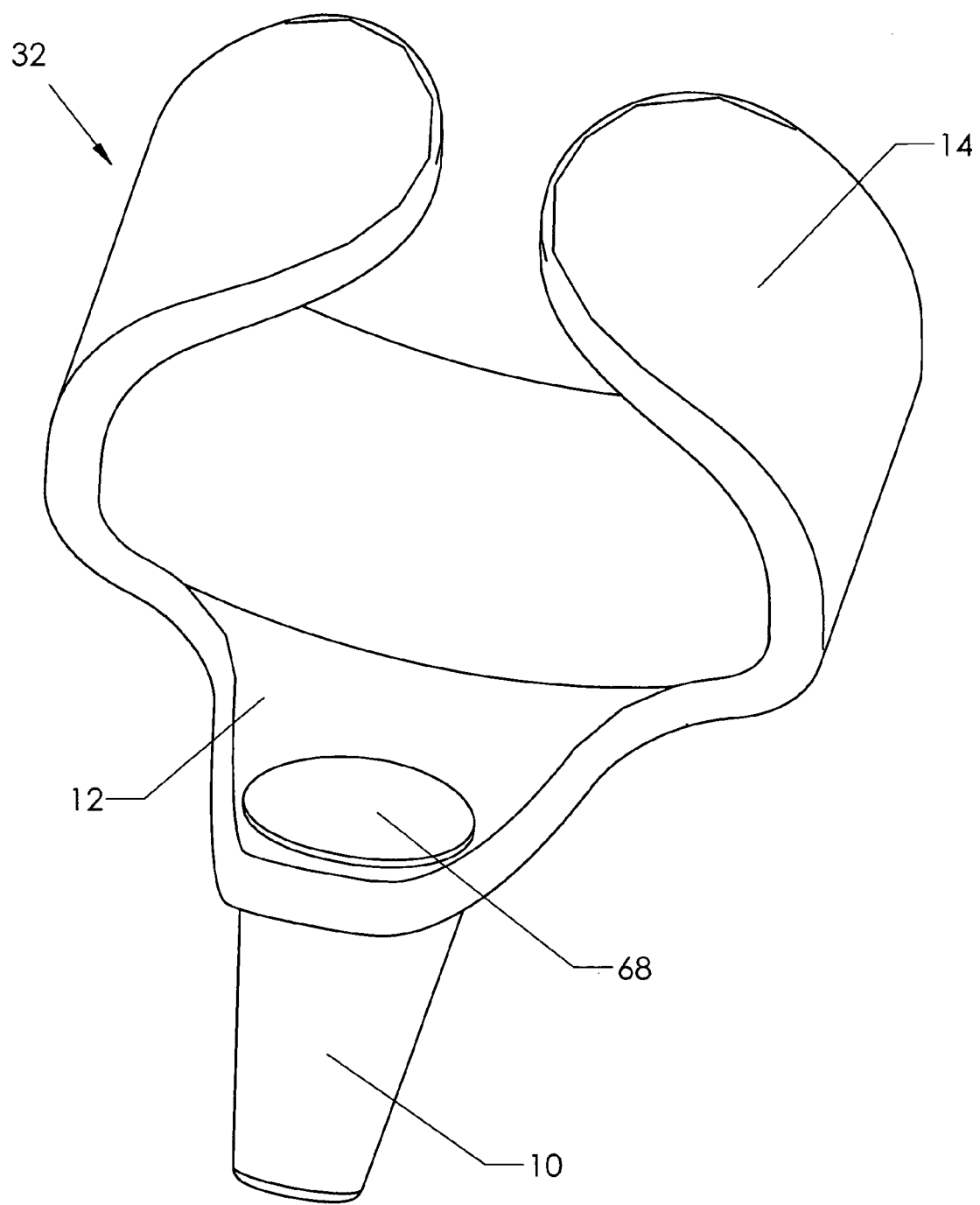
FIG. 34 is a perspective view, showing a stylus with a tip that extends through the tongue.

FIG. 33 shows yet another embodiment of the present invention. In this embodiment tip 10, including bridge surface 58, is made up of a conductive material. However, unlike the other embodiments, it is unnecessary for wrap 14 and tongue 12 to be made up of conductive material because tip 10 extends through tongue 12 to touch circle 68, as seen in FIG. 34. Touch circle 68 contacts the user's digit, thereby creating a conductive connection between tip 10 and user's digit.

Figure 35:
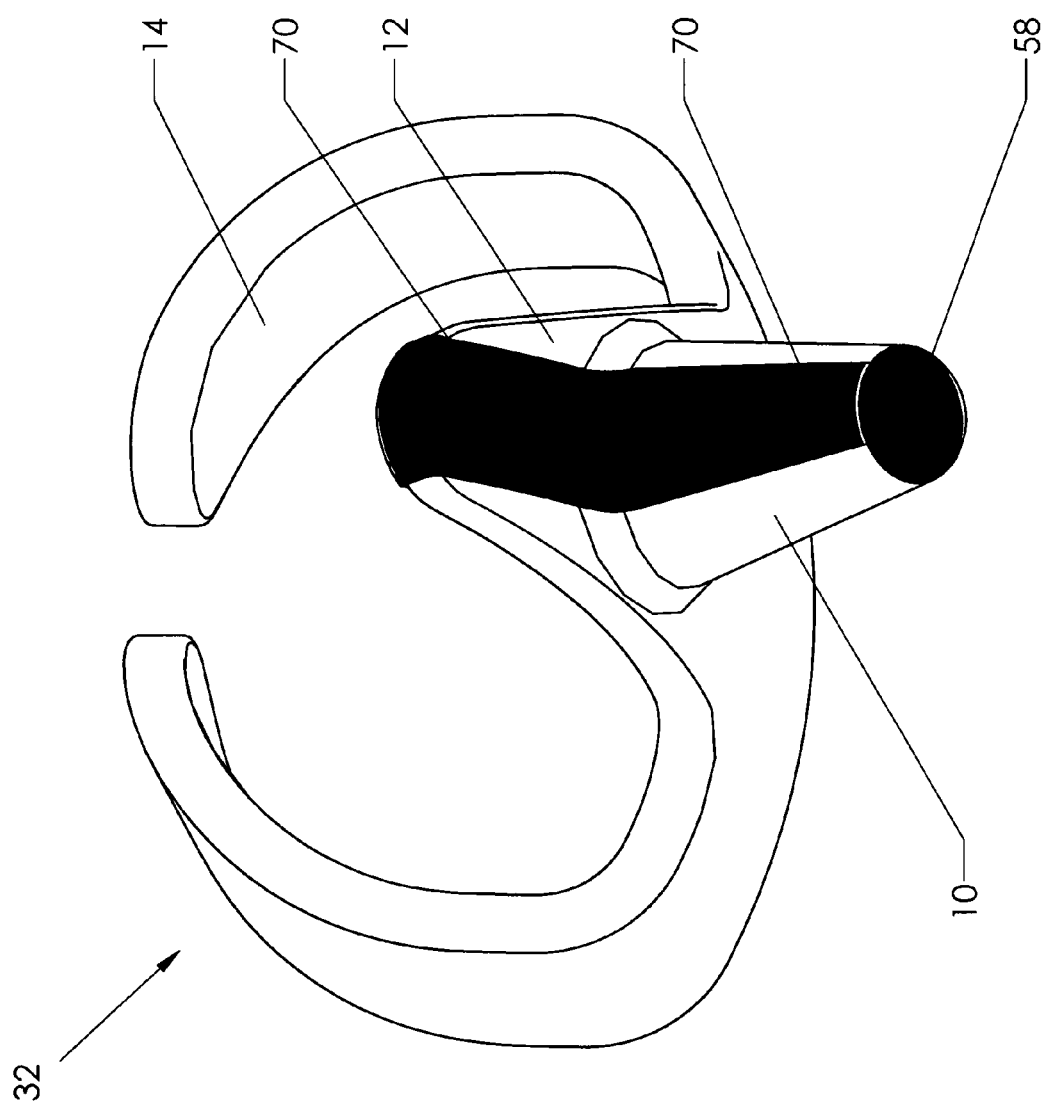
FIG. 35 is a perspective view, showing a stylus having a conductive ribbon which partially covers the tip and tongue of the present stylus.
Figure 36:
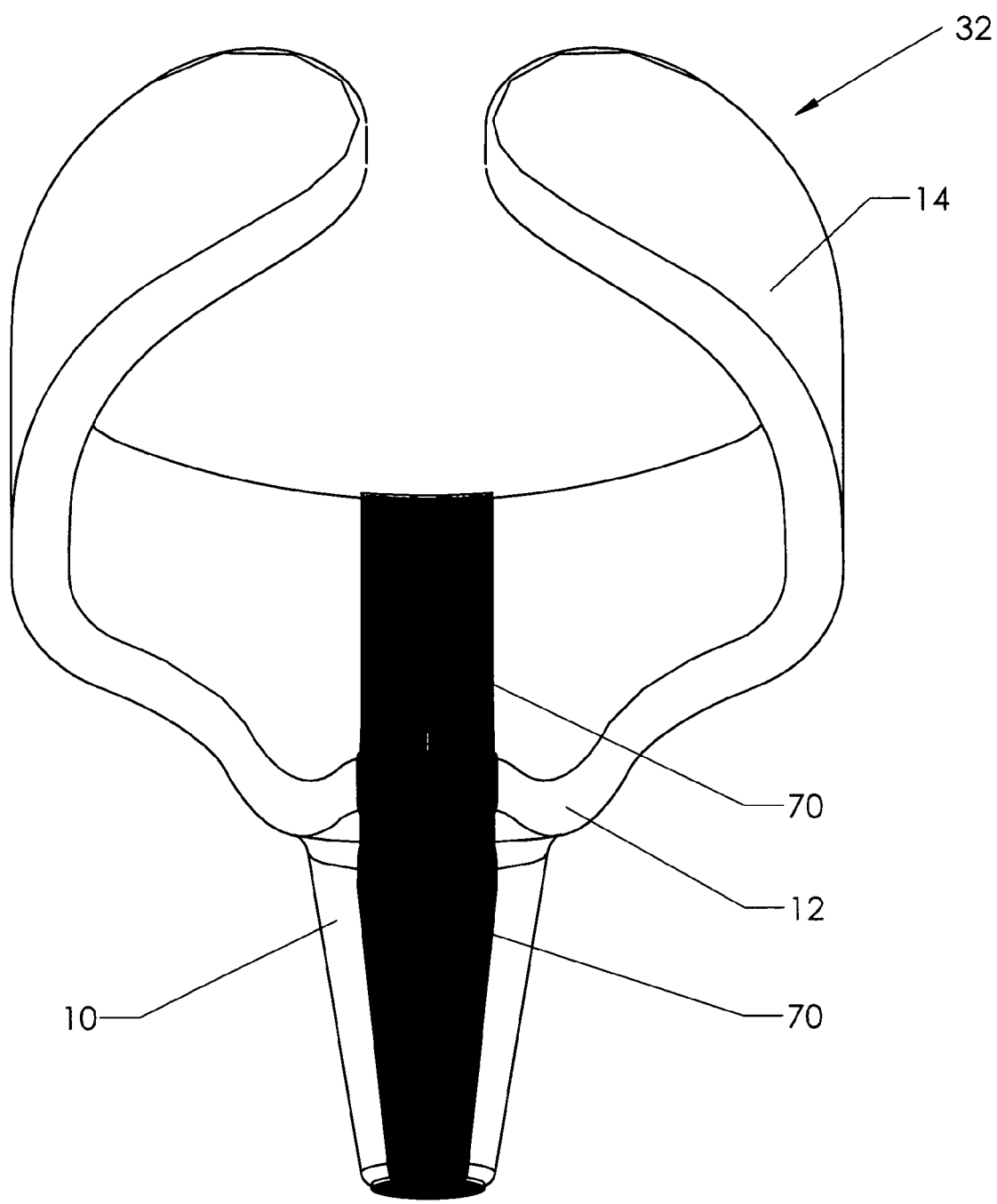
FIG. 36 is a perspective view, showing an alternative embodiment of the present invention where a conductive ribbon extends around the tip and tongue of the present stylus.

Another manner of creating a conductive connection between the touch-screen device and the user's digit is shown in FIG. 35 and FIG. 36. In this embodiment a conductive ribbon 70 extends from bridge surface 58 of tip 10, along the length of tip 10, around tongue 12, to the interior of wrap 14 or tongue 12 where conductive ribbon 70 is able to contact the user's digit. The reader will appreciate that conductive ribbon 70 could wrap around stylus 32 in any manner which at least connected bridge surface 58 of tip 10 with a point on stylus 32 that would continuously be in contact with user's digit when stylus 32 is worn by the user.

Figure 37:
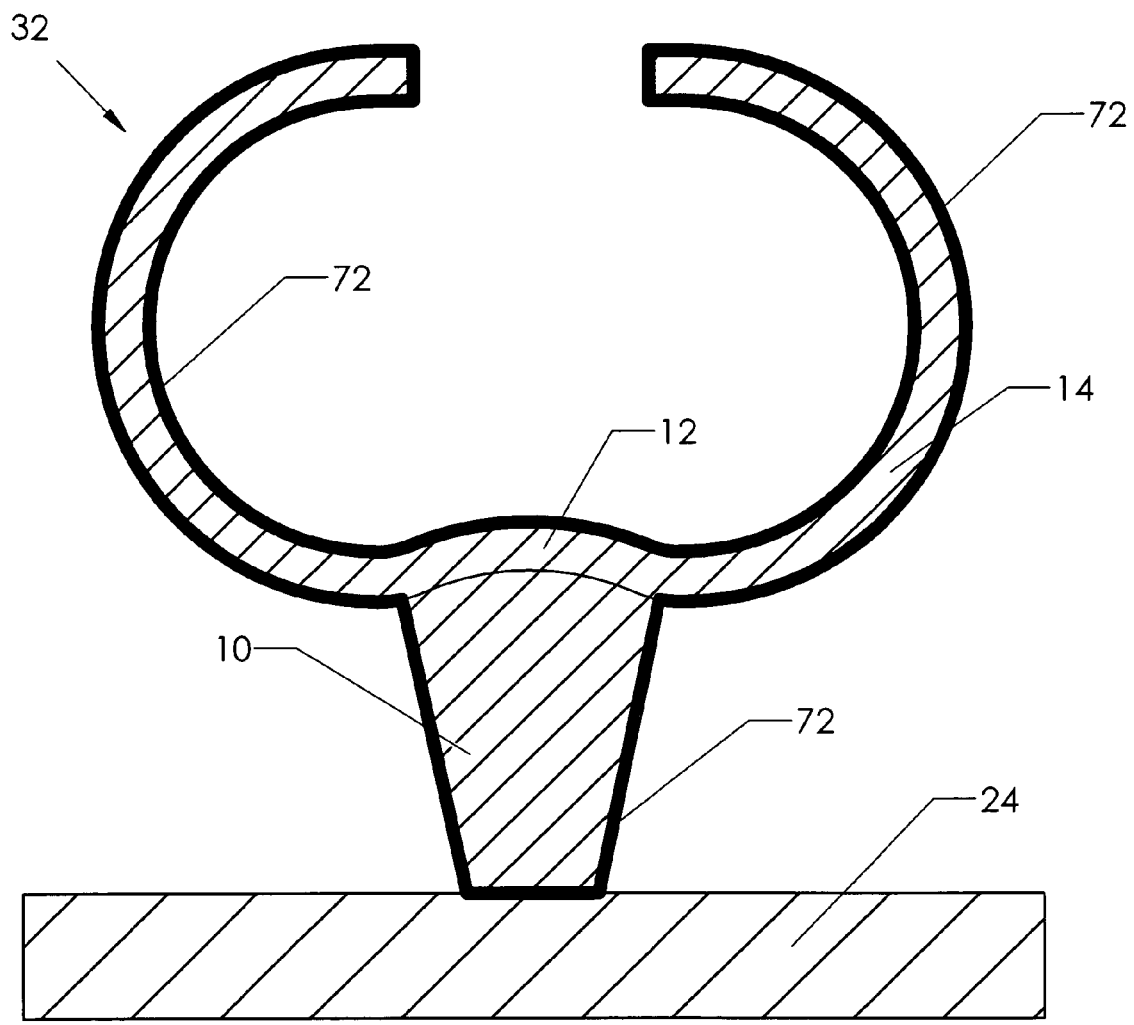
FIG. 37 is a cross section view, showing an alternative embodiment of the present invention in which a conductive plating is fully coating the exterior of the present invention.

Additionally, stylus 32 could be sprayed or covered in its entirety in conductive plating 72, such as nickel plating as seen in FIG. 37. In this embodiment conductive plating 72 would create the necessary conductive connection between touch-screen 24 and user's digit.

The preceding description contains significant detail regarding the novel aspects of the present invention. It should not be construed, however, as limiting the scope of the invention but rather as providing illustrations of the preferred embodiments of the invention. As an example, wrap 14 could be attached around digit 18 by way of a Velcro overlapping fabric situated around wrap 14. Additionally, tip 10 and conductive contactor 48 could be made in different lengths and thicknesses to correspond with different contact points on different types of touch-screen devices. Thus, the scope of the invention should be fixed by the following claims, rather than by the examples given.

Having described my invention, I claim:

1. A stylus allowing a user to operate a hand-held device having a capacitive touch screen user-interface responsive to physical contact by human skin, said user having a digit with a central axis, comprising:
    a. a wrap configured to at least partially encircle said digit and frictionally engage said digit, said wrap having a central axis which is approximately aligned with said central axis of said digit when said wrap is installed on said digit;
    b. at least one tip connected to said wrap, said at least one tip extending away from said wrap;
    c. said tip having a proximal extreme proximate to said wrap and a distal extreme distal to said wrap;
    d. said distal extreme of said tip being sufficiently pliable to form a flat surface covering an area of said capacitive touch screen when pressed against said capacitive touch screen;
    e. said tip being made of conductive material; and
    f. a conductor path passing from said tip to said wrap, said conductor path permanently connecting said tip to said wrap.

2. A stylus as recited in claim 1, wherein said connection between said at least one tip and said wrap comprises a tongue extending away from said wrap in a direction which is approximately parallel to said central axis of said wrap.

3. The stylus of claim 1, wherein said wrap includes a lanyard hole for attachment to a lanyard.

4. The stylus of claim 1, wherein said at least one tip is laterally offset from said tongue.

5. The stylus of claim 1, wherein said at least one tip extends downward from said central axis of said wrap at an acute angle.

6. The stylus of claim 1, wherein said at least one tip extends downward from said central axis of said wrap at an obtuse angle.

7. A stylus allowing a user to operate a hand-held device having a capacitive touch screen user-interface responsive to physical contact by human skin, said user having a digit with a central axis, comprising:
    a. a wrap configured to at least partially encircle said digit and frictionally engage said digit, said wrap having a central axis which is approximately aligned with said central axis of said digit when said wrap is installed on said digit;
    b. at least one tip connected to said wrap, said at least one tip extending away from said wrap;
    c. a conductive contactor, located on said at least one tip in a position distal to said wrap, said conductive contactor being conductive, being sufficiently pliable to form a flat surface covering an area of said capacitive touch screen when pressed against said capacitive touch screen, and being electrically connected to said at least one tip; and
    d. wherein said wrap and said at least one tip are made of conductive material and are permanently electrically connected to each other.

8. The stylus of claim 7, wherein said conductive contactor comprises a core of resilient material covered by a pliable conductive layer.

9. The stylus of claim 7, wherein said conductive contactor comprises a mass of pliable conductive wires.

10. A stylus as recited in claim 7, wherein said connection between said at least one tip and said wrap comprises a tongue extending away from said wrap in a direction which is approximately parallel to said central axis of said wrap.

11. The stylus of claim 7, wherein said at least one tip extends downward from said central axis of said wrap at an acute angle.

12. The stylus of claim 7, wherein said at least one tip extends downward from said central axis of said wrap at an obtuse angle.

13. A stylus allowing a user to operate a hand-held device having a capacitive touch screen user-interface responsive to physical contact by human skin, said user having a digit with a central axis, comprising:
   a. a wrap configured to at least partially encircle said digit and engage said digit, said wrap having a central axis which is approximately aligned with said central axis of said digit when said wrap is installed on said digit, said wrap being pliable and conductive;
   b. a tongue, having a proximal end attached to said wrap and a distal end extending away from said wrap, said tongue being electrically conductive;
   c. at least one tip, having a first end connected to said distal end of said tongue and a second end extending away from said tongue, said at least one tip being pliable and conductive, and said tip being permanently electrically connected to said tongue;
   d. a spring attached to said second end of said at least one tip, said spring being conductive;
   e. a contact disc, attached to said spring, said contact disc being conductive and being large enough to cover a circular area of said capacitive touch screen having a diameter between 2 mm and 20 mm.

14. A stylus as recited in claim 13, further comprising a joint having a ball and a socket, wherein said joint connects said contact disc to said second end of said at least one tip.

15. A stylus as recited in claim 13, wherein said tip is laterally offset from said tongue.

16. A stylus as recited in claim 13, wherein said tongue extends away from said wrap in a direction which is approximately parallel to said central axis of said wrap.

17. A stylus as recited in claim 13, wherein said wrap and said tip are coated in a conductive material.

18. A stylus as recited in claim 17, further comprising a pliable and conductive contactor placed on said distal extreme of said tip.

19. A stylus allowing a user to operate a hand-held device having capacitive touch screen user interface responsive to physical contact by human skin, said user having a digit with a central axis, comprising:
   a. a wrap configured to at least partially encircle said digit and frictionally engage said digit, said wrap having a central axis which is approximately aligned with said central axis of said digit when said wrap is installed on said digit;
   b. at least one conductive tip connected to said wrap, said at least one tip having a pliable bridge surface covering an area of said capacitive touch screen when pressed against said capacitive touch screen;
   c. a conductive ribbon;
   d. wherein said conductive ribbon attaches to said stylus such that said conductive ribbon covers said at least one tip at said bridge surface and extends around said at least one tip to come into contact with said digit of said user.

20. A stylus as recited in claim 19, wherein said at least one tip has a central bore, wherein said conductive ribbon extends from said bridge surface of said at least one tip through said central bore of said at least one tip to said wrap.

* * * * *

UNITED STATES PATENT AND TRADEMARK OFFICE
CERTIFICATE OF CORRECTION

| | |
|---|---|
| PATENT NO. | : 8,243,050 B2 |
| APPLICATION NO. | : 12/154986 |
| DATED | : August 14, 2012 |
| INVENTOR(S) | : Gordon K. Adkins |

It is certified that error appears in the above-identified patent and that said Letters Patent is hereby corrected as shown below:

On the title page, Item (76)

The inventor is listed as follows: Adkiins; Gordon K. (St. George Island, FL). The Inventor's name is spelled incorrectly, it should read as follows: Adkins; Gordon K. (St. George Island, FL). The misspelling of the Inventor's name in the Patent Letters is the first occurrence of the misspelling.

Signed and Sealed this
Eighth Day of October, 2013

Teresa Stanek Rea
*Deputy Director of the United States Patent and Trademark Office*